United States Patent
Maron et al.

(10) Patent No.: US 11,922,486 B2
(45) Date of Patent: Mar. 5, 2024

(54) IDENTIFYING ITEMS USING CASCADING ALGORITHMS

(71) Applicant: Amazon Technologies, Inc., Seattle, WA (US)

(72) Inventors: Oded Maron, Sudbury, MA (US); Jeremy Samuel De Bonet, Southborough, MA (US); Daniel Ron, Somerville, MA (US); Ejaz Ahmed, Needham, MA (US); Mirko Ristivojevic, Cambridge, MA (US); Jonathan Cohn, Acton, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/898,212

(22) Filed: Aug. 29, 2022

(65) Prior Publication Data
US 2023/0069472 A1  Mar. 2, 2023

Related U.S. Application Data

(63) Continuation of application No. 16/355,598, filed on Mar. 15, 2019, now Pat. No. 11,430,044.

(51) Int. Cl.
*G06Q 30/06* (2023.01)
*G06Q 30/0601* (2023.01)
(Continued)

(52) U.S. Cl.
CPC ......... *G06Q 30/0633* (2013.01); *G06V 10/40* (2022.01); *G06V 10/751* (2022.01);
(Continued)

(58) Field of Classification Search
CPC .. G06Q 30/0633; G06V 10/40; G06V 10/751; G06V 20/00; G06V 30/10;
(Continued)

(56) References Cited

U.S. PATENT DOCUMENTS

| 7,660,747 B2 | 2/2010 | Brice et al. |
| 8,901,442 B1 | 12/2014 | Dilone |

(Continued)

FOREIGN PATENT DOCUMENTS

| CN | 108698089 | 10/2018 | |
| WO | WO2017146595 | * 8/2017 | ............ G06Q 30/06 |
| WO | WO2018203512 | 11/2018 | |

OTHER PUBLICATIONS

Office Action for U.S. Appl. No. 16/355,598, dated May 11, 2021, Maron, "Identifying Items Using Cascading Algorithms", 15 pages.

(Continued)

*Primary Examiner* — Jerome Grant, II
(74) *Attorney, Agent, or Firm* — Lee & Hayes P.C.

(57) ABSTRACT

This disclosure is directed to using cascading algorithms to automatically identify items placed in a tote or other receptacle utilized by users in material handling facilities as the users move around the facilities. A tote may store a database or "gallery" of item representations for all of the items that are stored in the facility that a user may place in their totes. The tote may use multiple algorithms in a cascading manner to analyze the gallery of item representations in order to iteratively narrow the search space of item representations in the gallery to determine which of the items was placed in the tote by a user. Upon identifying the item placed in the tote, the tote may add an item identifier for the item to a virtual listing of item identifiers representing items previously placed in the tote.

20 Claims, 8 Drawing Sheets

(51) Int. Cl.
*G06V 10/40* (2022.01)
*G06V 10/75* (2022.01)
*G06V 20/00* (2022.01)
*G06V 30/10* (2022.01)
*H04W 4/02* (2018.01)
*H04W 4/33* (2018.01)
*H04W 4/38* (2018.01)
*G06T 7/50* (2017.01)
*G06T 7/60* (2017.01)
*G06T 7/90* (2017.01)

(52) U.S. Cl.
CPC .............. *G06V 20/00* (2022.01); *G06V 30/10* (2022.01); *H04W 4/023* (2013.01); *H04W 4/33* (2018.02); *H04W 4/38* (2018.02); *G06T 7/50* (2017.01); *G06T 7/60* (2013.01); *G06T 7/90* (2017.01)

(58) Field of Classification Search
CPC ....... G06V 10/74; G06V 20/52; H04W 4/023; H04W 4/33; H04W 4/38; H04W 4/029; G06T 7/50; G06T 7/60; G06T 7/90
USPC .......................................................... 382/103
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,026,044 B1* | 7/2018 | Wurman | G06Q 10/08 |
| 10,402,445 B2 | 9/2019 | Newman et al. | |
| 10,528,996 B2 | 1/2020 | Clark et al. | |
| 10,600,043 B2 | 3/2020 | Chaubard et al. | |
| 10,614,512 B1 | 4/2020 | Ogborn et al. | |
| 10,691,943 B1 | 6/2020 | Ferstl et al. | |
| 10,769,579 B1 | 9/2020 | Smith et al. | |
| 10,953,906 B1 | 3/2021 | McMahon et al. | |
| 10,984,205 B1* | 4/2021 | Ahmed | G06K 7/1473 |
| 11,059,506 B2 | 7/2021 | Hagen et al. | |
| 11,132,550 B2 | 9/2021 | Krishnamurthy et al. | |
| 11,170,340 B1* | 11/2021 | Chandra | G06Q 10/0838 |
| 11,625,725 B1* | 4/2023 | Williams | G06Q 20/409 705/71 |
| 2008/0052202 A1 | 2/2008 | Bodin et al. | |
| 2008/0055084 A1 | 3/2008 | Bodin et al. | |
| 2008/0231432 A1 | 9/2008 | Stawar et al. | |
| 2008/0238009 A1 | 10/2008 | Carpenter | |
| 2009/0102859 A1 | 4/2009 | Athsani et al. | |
| 2013/0284806 A1 | 10/2013 | Margalit | |
| 2014/0091690 A1 | 4/2014 | Savage et al. | |
| 2015/0029339 A1* | 1/2015 | Kobres | H04N 7/181 348/150 |
| 2015/0052011 A1 | 2/2015 | Bozek | |
| 2015/0070503 A1 | 3/2015 | Kraeling et al. | |
| 2015/0127496 A1* | 5/2015 | Marathe | G06Q 10/087 705/28 |
| 2015/0269549 A1 | 9/2015 | Herring et al. | |
| 2015/0310539 A1 | 10/2015 | McCoy et al. | |
| 2016/0132733 A1* | 5/2016 | Kundu | G07G 3/003 348/150 |
| 2017/0140330 A1 | 5/2017 | Rinzler et al. | |
| 2017/0223782 A1 | 8/2017 | Imai | |
| 2017/0263100 A1 | 9/2017 | Johnston | |
| 2018/0053231 A1 | 2/2018 | Clark et al. | |
| 2018/0099185 A1 | 4/2018 | Jones et al. | |
| 2018/0114250 A1 | 4/2018 | Phillips et al. | |
| 2018/0182242 A1 | 6/2018 | Vijaya Kumar et al. | |
| 2018/0197218 A1* | 7/2018 | Mallesan | G07G 1/0054 |
| 2018/0253604 A1 | 9/2018 | Hiramatsu et al. | |
| 2019/0156121 A1 | 5/2019 | Kucharski et al. | |
| 2019/0188876 A1 | 6/2019 | Song et al. | |
| 2019/0217477 A1 | 7/2019 | Paepcke et al. | |
| 2019/0264372 A1 | 8/2019 | Kessler et al. | |
| 2019/0295149 A1 | 9/2019 | Kramer et al. | |
| 2019/0302764 A1 | 10/2019 | Smith et al. | |
| 2019/0311472 A1 | 10/2019 | Harrup et al. | |
| 2019/0315248 A1 | 10/2019 | Demirovic et al. | |
| 2020/0005063 A1 | 1/2020 | Ralls et al. | |
| 2020/0005641 A1 | 1/2020 | Park | |
| 2020/0027106 A1 | 1/2020 | Kendrick | |
| 2020/0027567 A1 | 1/2020 | Xie et al. | |
| 2020/0151265 A1 | 5/2020 | Gupta et al. | |
| 2020/0158822 A1 | 5/2020 | Owens et al. | |
| 2020/0228944 A1 | 7/2020 | Bender et al. | |
| 2020/0264005 A1 | 8/2020 | Heo et al. | |
| 2020/0265229 A1 | 8/2020 | Badr et al. | |
| 2020/0275059 A1* | 8/2020 | De Bonet | G06V 20/52 |
| 2020/0287625 A1 | 9/2020 | Saes et al. | |
| 2020/0354059 A1 | 11/2020 | Newman et al. | |
| 2021/0046862 A1 | 2/2021 | Wang | |
| 2021/0048815 A1 | 2/2021 | McErlean et al. | |
| 2021/0103747 A1 | 4/2021 | Moustafa et al. | |
| 2021/0124913 A1 | 4/2021 | Anderson | |
| 2021/0287013 A1 | 9/2021 | Carter et al. | |
| 2021/0345794 A1 | 11/2021 | Cohn et al. | |

OTHER PUBLICATIONS

Office Action for U.S. Appl. No. 16/355,598, dated Sep. 21, 2020, Maron, "Identifying Items Using Cascading Algorithms", 13 Pages.
Office Action for U.S. Appl. No. 16/355,598, dated Jan. 12, 22, Maron, "Identifying Items Using Cascading Algorithms", 17 pages.
Office Action for U.S. Appl. No. 16/355,598, dated Aug. 30, 2021, Maron, "Identifying Items Using Cascading Algorithms", 20 pages.

* cited by examiner

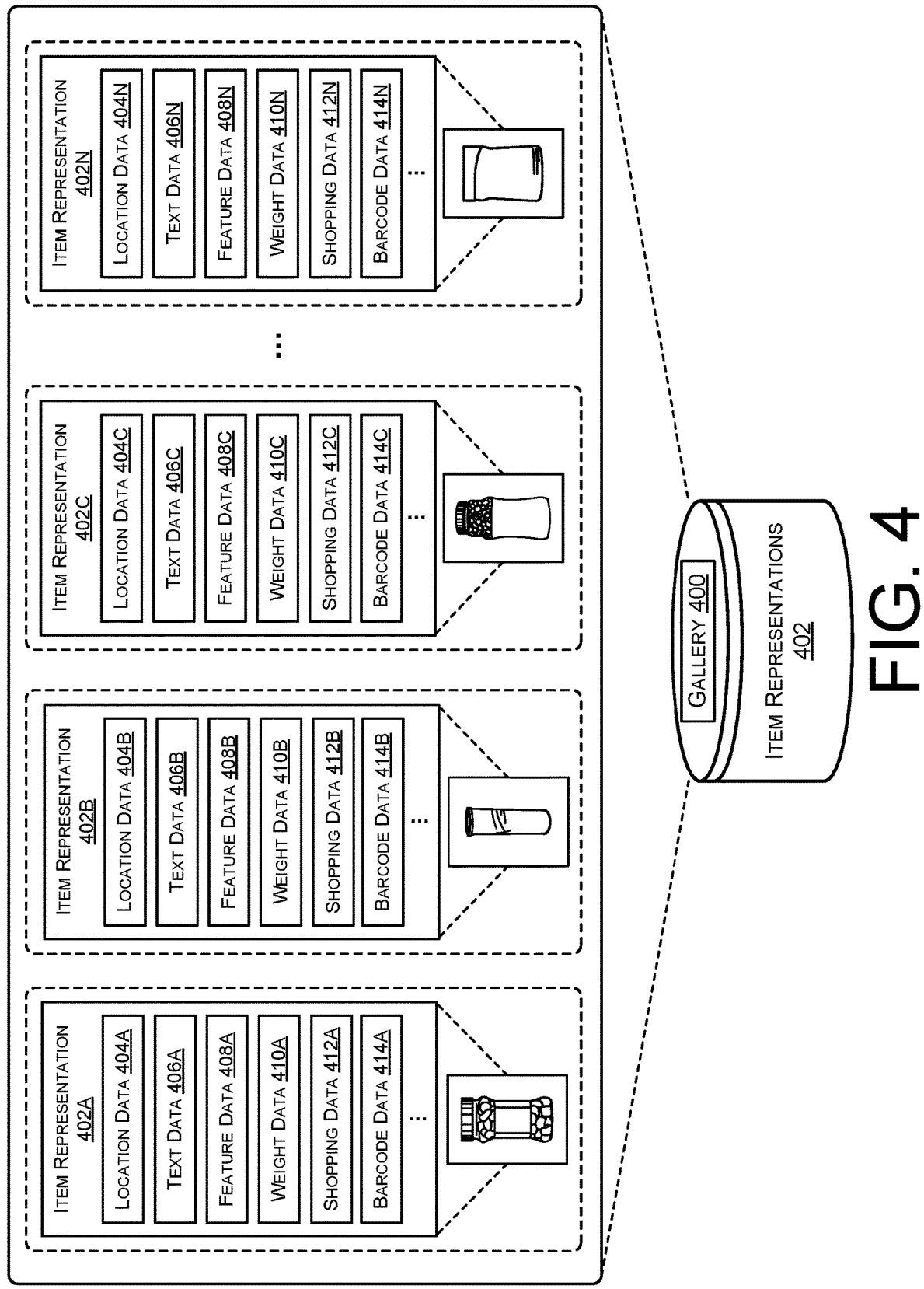

IDENTIFYING ITEMS USING CASCADING ALGORITHMS

CROSS-REFERENCE TO RELATED APPLICATION

This application is a continuation application of, and claims priority to, U.S. patent application Ser. No. 16/355,598, filed on Mar. 15, 2019, entitled "Identifying Items Using Cascading Algorithms," the contents of which are incorporated by reference herein.

BACKGROUND

Materials handling facilities, such as warehouses or retail stores, often provide users with totes, carts, or baskets to facilitate the processes by which the users locate, identify, retrieve, and transport items at the facilities. For example, when a user identifies an item that he or she desires on a shelf or other location within a materials handling facility, the user may remove the item from the shelf or other location, and place the item into a receptacle of a tote before the user continues to travel through the facility in search of additional items. The tote may have a durable frame or structure that is configured to travel on wheels such that users are able to fill the totes with numerous, and potentially heavy, items they desire, and use the tote to transport the items around the materials handling facility with ease, rather than having to carry the items.

Traditionally, when the user has finished identifying and retrieving the items he or she desires, the user may transport the items in the tote to a check-out destination within the materials handling facility, such as a distribution station, a cashier, or a dedicated self-checkout stand, and transition the items to a human operator or an automated agent. Typically, the user or the human operator manually removes the items from the tote, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the tote.

Thus, retrieving items from shelves or other locations within a materials handling facility, and placing the items into bags or other carriers for transportation to their desired destination (e.g., automobile or home), may be a two-step process. First, the items must be retrieved from the shelves or other storage locations and placed into the tote, and second, the items must be removed from the tote, scanned, and placed into a bag or other item carrier. These intervening actions that are required to transition items from a shelf or other storage location into the bags or other item carrier necessarily slows the process by which items are retrieved from a materials handling facility, and tend to mitigate the advantages that totes provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example gallery of item representations of items offered for acquisition in a materials handling facility.

DETAILED DESCRIPTION

Figure 1:
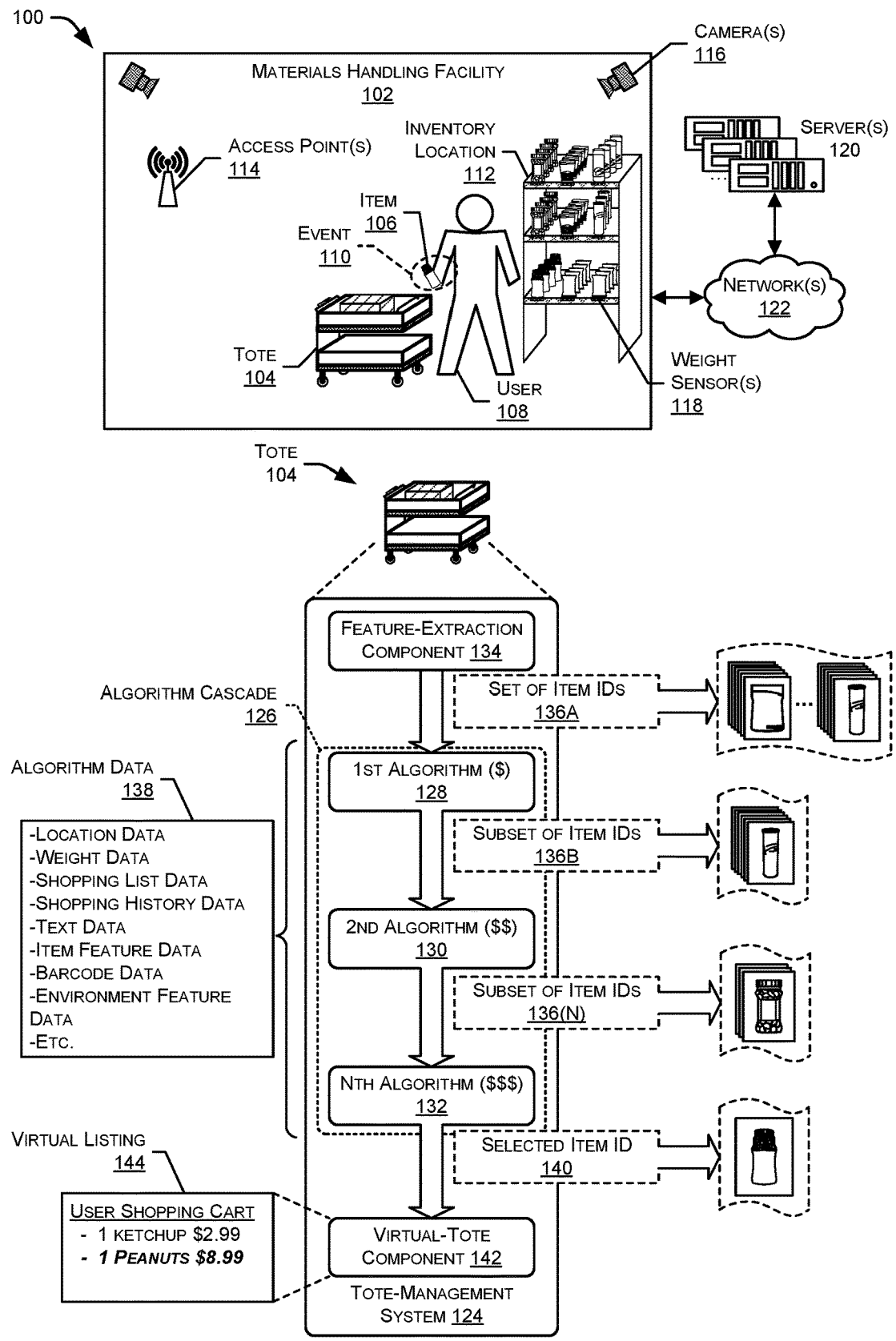
FIG. 1 illustrates an example environment of a materials handling facility that includes an item-identifying tote to identify items placed in, and removed from, the tote by a user. The tote uses cascading algorithms that analyze various data, such as image data and/or other sensor data, to identify the item from a gallery of item representations, and updates a virtual item listing using the item identifier.

This disclosure is directed to using cascading algorithms to automatically identify items placed in a tote, basket, cart, or other receptacle that may be utilized by users in material handling facilities as the users move around the material handling facilities. The techniques described herein include the use of a database or "gallery" of item representations for all of the items that are stored in a materials handling facility (or "facility") that users may place in their totes. In some examples, multiple algorithms may be utilized in a cascading manner to analyze the gallery of item representations in order to iteratively narrow the search space of item representations in the gallery to determine which of the items offered in the facility was placed in the tote by a user. Rather than utilizing a single, resource-intensive algorithm or technique to identify an item placed in a tote, the techniques described herein include the use of multiple algorithms in a cascading structure to iteratively reduce the number of candidate items in the facility that may have been placed in the tote to identify the actual item placed in the tote.

Traditionally, facilities that offer items (or products) for acquisition by users may provide users with traditional shopping carts that have a durable frame, including or supporting a basket, multiple wheel castors configured to allow the cart to move on a surface, and handle for users to push the tote around in a facility. These facilities often offer other types of totes, such as hand baskets to store items as the user moves around the store. While these totes are useful for storing items on behalf of users during their shopping session, they result in additional effort for the users during a traditional checkout experience. For example, users must first retrieve items from shelves or other storage locations and place the items into the tote, and second, the users must remove the items from the tote, have the items scanned, and then placed back into a bag or other item carrier. These intervening actions that are required to transition items from a shelf or other storage location into the bags or other item carrier necessarily slows the process by which items are retrieved from a materials handling facility, and tend to mitigate the advantages that totes provide.

The techniques described herein generally include the use of item-identifying totes that may be utilized by users in material handling facilities to automatically identify items that the users place in their totes as they move around the material handling facilities. Upon identifying items, the item-identifying totes may update virtual item listings for the users to represent the items that have been placed in, or removed from, the physical totes. According to the techniques described herein, an item-identifying tote (or "smart tote") may include one or more cameras coupled to the tote to generate image data representing items that a user places in the tote, and/or removes from the tote. The tote may include one or more components (e.g., software component(s), hardware processor(s), etc.) that analyze the image data to determine an item identifier for the item(s) placed in the tote, or removed from the tote, and update a virtual item listing for the user of the tote. Once a user has finished their shopping session, the user may be able to efficiently check-out of the facility without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual item listing of the user that were identified by the tote during the user's shopping session.

To identify the items that are added to, or removed from, a tote by a user, the totes may utilize multiple algorithms to analyze various types of data in order to iteratively narrow the number of candidate items that may have been placed in the tote. Generally, an operator of a facility (e.g., stores, warehouses, etc.) may store large amounts of items at various inventory locations (e.g., gondolas, shelves arranged in aisles, etc.) throughout the facility for users to select and place in their totes. To identify which item was selected by a user, the totes may store a database or "gallery" of item representations (or "item data") for each item offered for acquisition in the facility. For each item placed in the tote, the tote may use one or more cameras to generate image data representing the item, and extract various types of data from that image data. The tote may further be configured to compare the extracted data to the item representations for each candidate item to identify which item was actually placed in the tote, and update a virtual item listing for the tote. For instance, the tote may be configured to extract various feature data from the image data that represents the item (e.g., color of the item, dimensions of the item, shape of the item, etc.), and compare the feature data to feature data included in each item representation in the gallery.

However, in some examples, the operator of the facility may offer relatively large amounts of items for acquisition by users (e.g., 5,000 items, 25,000 items, 100,000 items, etc.). Depending on the algorithm used to compare the feature data of the item placed in the tote with feature data in each item representation in the gallery, the amount of computing resources (e.g., processing power, battery power, memory, etc.) and/or amount of time required by the totes to identify the item may be relatively large, which may reduce the performance of the tote as well as user experience.

Accordingly, the techniques described herein include using multiple (two or more) algorithms in a cascading, or serial, structure to iteratively narrow the search space of item representations in order to identify the item placed in the tote from the gallery. In some instances, the first algorithm used may require less computing resources (e.g., "inexpensive algorithm") and/or time to reduce the initial search space of item representation in the gallery to a smaller, more manageable set of item representations. In an illustrative example, the first algorithm may be applied to an initial search space of 25,000 item representations in the gallery, and reduce the number of candidate item representations to a first set of 1,000 candidate item representations. After applying the first algorithm, a second algorithm may be applied to the first set of candidate item representations to further reduce the number candidate item representations. The second algorithm may be more expensive, or require more resources and/or time, than the first algorithm. However, the second algorithm may be comparing the item data for the item placed in the tote with a smaller set of candidate item representations. In some instances, the second algorithm may result in a smaller set of candidate item representations for further analysis with additional algorithms. However, in some instances, the second algorithm may identify, with a high enough confidence, an item representation from the gallery that corresponds to the item placed in the tote. After iteratively applying two or more algorithms to the gallery of item representations, and identifying the item representation that corresponds to the item placed in the tote, the tote may update a virtual tote, or a virtual listing of item representations that correspond to other items placed in the tote by adding the identified item representation for the item. In this way, multiple algorithms may be applied in a cascading structure to an initial gallery, or search space, of item representations to identify what item was placed in a tote in a facility.

Various algorithms and various types of data may be utilized by the tote to determine what item was placed in the tote. For instance, the tote may periodically, or continually, generate location data that indicates a location of the tote in the facility. The tote may include one or more sensors configured to generate sensor data that may be analyzed to approximate the location of the tote in the facility. For instance, the tote may include sensors such as one or more network interfaces to emit and/or detect wireless signals (e.g., WiFi®, Bluetooth®, etc.) that may be used to identify a location of the tote. The tote may receive wireless signals and determine, based on which access point(s) in the facility emitted the wireless signals and/or a signal strength of the received signal(s) (RSSI), the location of the tote in the facility. In other examples, the sensors may generate sensor data indicating radio frequency identifiers (RFIDs) emitted from RF emitters around the facility, and the tote may analyze the sensor data to determine the location of the tote based on which RF emitter transmitted a detected signal with an RFID. After determining the location of the tote, the tote may utilize an algorithm to analyze location data included in the item representations in the gallery of item representations. The tote may narrow the search space of item representations in the gallery based on which items are located within a threshold distance to the tote because the user is likely to select items located near their tote as they shop. As a specific example, the tote may apply the first algorithm to an initial search space of 25,000 item representations in the gallery, and reduce the number of candidate item representations to a first set of 1,000 candidate item representations that are located within the threshold distance to the tote. In some examples, the first algorithm may require relatively low amounts of computing resources and/or time, such as a simple matching/thresholding algorithm that determines if locations of each of the potential 25,000 items are within a threshold distance to the location of the tote.

After applying the first algorithm, the tote may apply a second algorithm to further narrow the search space. As an example, the tote may use camera(s) coupled to the tote to generate image data representing the item placed into the tote (e.g., sequence of images or image frames), and process the image data to determine text on the item (e.g., text on the label such as manufacturer/brand, type of item, ingredients, etc.). Using this text, the tote may utilize a second algorithm that matches the text to respective text data for each of the 1,000 items, and determine which of the items remaining in the search space have text on them that matches the text on the item placed into the tote. Continuing the above example, the second algorithm may reduce the number of candidate item representations to a second set of 10 candidate item representations that have text on them that match to the text on the item.

After applying the second algorithm, the tote may apply a third algorithm to identify the particular item from the second set of candidate item representations. For instance, the tote may identify, from the image data, feature data representing physical characteristics of the item (e.g., color, shape, dimension, amount of text, etc.). The tote may then utilize a third algorithm that matches the feature data of the item to respective feature data for each of the 10 items, and determines which of the items in the search space have feature data that matches the feature data of the item placed in the tote. The tote may select the item representation with the highest confidence value that indicates a correspondence between the feature data of the item and the respective feature data of the remaining 10 item representations. Upon identifying the item, the tote may update a virtual item listing of the tote to include an item identifier that corresponds to the item placed in the tote.

In some examples, the image data generated by the camera may be analyzed by the software components of the tote to determine whether or not an item is being placed in the tote, or removed from the tote. For instance, the image data may represent, over time, movement of the item into the tote, or out of the tote. As another example, the tote may include one or more weight sensors configured to generate sensor data that indicates an increase in weight of items in the tote (e.g., item was added to the tote), or a decrease in weight of items in the tote (e.g., item was removed from the tote). Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the tote may store an indication that the item identifier was added to the tote, or removed from the tote, and update a virtual item listing accordingly.

To utilize a smart tote as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or totes, can recognize the user. For instance, the user may have registered to identify themselves to the tote using any identification technique, such as presenting an identification means to a camera/scanner (e.g., presenting a driver's license, presenting a facility-issued card, presenting a user identifier via a mobile phone, etc.), speaking a predefined utterance (e.g., a name of the user, a predefined keyword, etc.), and/or looking into a camera for facial recognition. Once a user has identified themselves to a smart tote or another device in the facility, the user may begin a shopping session where the smart tote identifies and track items retrieved by the user and placed in the smart tote.

After the user has moved throughout the materials handling facility and selected the items they desire to purchase or otherwise take from the facility, the user may end the shopping session in various ways. For instance, the user may return a tote to a tote corral or other storage location, provide input to the tote indicating an end of the shopping session (e.g., utterance, utilize a user interface element on a touch display, etc.), or simply remove bags or other item carriers from the tote and leave the facility. After the user has ended their shopping session, the list of item identifiers in the virtual item listing may be uploaded to one or more remote servers that manage user accounts for users of the facility. The servers may charge the appropriate user account for the listing of the items in the virtual item listing that the user took from the facility.

Although some of the techniques described below are performed locally on the tote, in other examples, some or all of the techniques may be performed by one or more backend devices or servers associated with the facility. For instance, the sensor data and/or image data may be collected at the tote and sent over network(s) to backend devices at the facility, or server devices located remote from the facility, to be processed remotely. However, in some instances it may be advantageous for at least some of the processing to be performed on the tote to reduce latency in identifying items placed in the tote. For instance, it may be advantageous to have low latency when requesting that a user provide feedback to help identify an item recently placed in the tote, rather than the user continuing their shopping session and being asked later about an item. Further, while various techniques described below are with reference to purchasing items in a retail facility, the techniques are generally applicable to any materials handling facility in which a user may place items in a tote. For example, although the techniques described herein are primarily with reference to identifying items placed in a tote by a user for the purpose of identifying a user account to charge for items selected from a materials handling facility, the techniques are equally applicable to any industry in which user recognition may be helpful. For instance, the idem-identifying tote may be implemented for distribution centers where employees collect items from various locations to be shipped through the mail system.

In some instances, the techniques may be performed with traditional totes, carts, or baskets that do not include any sensors or electronics at all. For instance, the facilities themselves may include sensors such as weight sensors, cameras, etc., that send sensor data and image data to backend devices to perform the techniques described herein. The backend devices may analyze the sensor data and/or image data using the cascading algorithms as described herein, and maintain a virtual item listing for the users in the facility.

Although the techniques described herein are with reference to a session of a user in a materials handling facility, the techniques are generally applicable to any item-recognition environment. Other examples may include inventory-management systems automating the intake of new shipments of item inventory, libraries for processing returned books and/ or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes an item-identifying tote 104 to identify items 106 placed in, and removed from, the tote 104 by a user 108. The tote 104 uses cascading algorithms that analyze various data, such as image data and/or other sensor data, to identify the item from a gallery of item representations, and updates a virtual item listing using the item identifier. The tote uses one or more cameras and/or sensors to detect an item 106, generates image data depicting the item 106, analyzes the image data to identify an item identifier for the item 106, determines the event 110 involving the item (e.g., add to tote, remove from tote, multiple items, quantity of items, etc.) and updates a virtual item listing using the item identifier.

As FIG. 1 depicts, the user 108 may have engaged in a shopping session in the materials handling facility 102. For instance, the user 108 may have selected an item 106 from an inventory location 112 (e.g., shelf, aisle, etc.) and placed the item 106 in the tote 104 (e.g., shopping tote). The inventory location 112 may house one or more different types of items 106 and the user 108 may pick (i.e., take, retrieve, etc.) one of these items 106.

Upon entering a facility 102, a user 108 may desire to utilize a tote 104 for their shopping session to transport items 106 around the facility 102 during their shopping session. In such examples, the user 108 may approach a cart corral, basket stack, or other tote storage location at which totes 104 are stored. In some examples, a tote corral may comprise a structure, such as an aisle, for storing nested totes. Generally, two or more of the totes may be configured to nest or otherwise functionality join with one another, so that the totes may be easily stored in a tote corral, and/or transported in bulk. In some examples, the tote corral may provide additional functionality beyond storage. For instance, the tote corral may facilitate charging of the nested totes that are in the tote corral. For instance, the tote corral may have various electrical contacts extending along the length of a horizontal and/or vertical member of the corral that, when placed in electrical contact with an electrical contact of the nested totes, charge one or more batteries of the nested totes. In other examples, power cords may extend from the tote corral that may be plugged into the nested totes to recharge batteries of the nested totes while not in use.

To utilize a tote 104, a user 108 may approach an unused tote that is not currently engaged in a shopping session (e.g., a stored tote), and interact with the unused tote 104 to identify themselves to the tote 104 and begin a shopping session. For instance, the totes 104 may include sensors, such as a barcode sensor (e.g., an image sensor such as a camera, photodetector, or other sensing apparatus designed to read a one or two-dimensional barcode) such that when a user 108 presents a user device, or portion thereof, such as the display, to the barcode sensor, the tote 104 may identify the user and corresponding user account for a shopping session. Other types of interaction may be performed by a user 108 to identify themselves to a tote 104 (e.g., uttering a name or other keyword to identify the user 108, presenting the user's face for facial recognition, typing in a password or other user information into a display of the tote 104, and/or any other type of user identification technique).

Once a user has identified themselves to the tote 104, the item-identifying functionality of the tote 104 may be activated such that subsequent items 106 placed in the tote 104 will be identified by the tote 104, and added to a virtual item listing for the user 108. As illustrated, a user 108 may move the tote 104 around the facility 102 to one or more inventory locations 112. The user 108 may retrieve items from the inventory location 112, and place the items 106 in the tote 104. Additionally, the use 104 may retrieve items 106 from the tote 104, and put the items 106 back in an inventory location 112, such as when the user 108 changes their mind regarding their desire to purchase or otherwise acquire the item 106. The tote 104 may include various components for identifying item identifiers corresponding to the items 106 placed in the tote, and maintaining a virtual item listing for the shopping session of the user 108.

In some instances, the facility 102 may include various sensors configured to interact with the tote 104 and/or generate sensor data in addition to, or as an alternative to, the sensor data generated by the tote 104. For instance, the facility 102 may include one or more access points 114 configured to emit signals (e.g. WiFi, Bluetooth Beacons, etc.) that are detected by the tote 104 for use in determining the location of the tote 104 in the facility 102. Further, the facility 102 may include one or more camera(s) 116 configured to generate image data that depicts the facility 102, such as the events 110 occurring in the facility, items 106 involved in the events, and/or users 108 that selected the items 106. Further, the facility 102 may include one or more weight sensors 118 disposed in the inventory locations 112 to detect generate sensor data indicative of the removal of, or return of, items 106 from the inventory locations 112. The facility 102 may include one or more backend devices or servers, and/or may transmit the data to the servers 120 at a remote location, for analysis using the cascading algorithm techniques described herein. That is, the techniques described herein may be performed entirely by the tote 104 using sensor data and image data generated by sensors of the tote, entirely by backend devices/servers of the facility 102 (or remote servers) using sensor data and image data generated by the tote, entirely by backend devices/servers of the facility 102 (or remote servers) using sensor data and image data generated by sensors in the facility, and/or any combination thereof.

As illustrated in FIG. 1, the tote 104 may include a tote-management system 124 that includes an algorithm cascade 126 of two or more algorithms to determine what item 106 was placed in the tote 104. The algorithm cascade 126 is illustrated as including a first algorithm 128, a second algorithm 130, and an Nth algorithm 132 where "N" is any integer greater than two. The tote-management system 124 may further include a feature-extraction component 134 configured to extract feature data from an event 110 that involved an item 106. For instance, the feature-extraction component 134 may determine, using sensor data, a location of the tote 104 when the event 110 occurred, extract text from the item 106 involved in the event 110, extract feature data (e.g., color, dimensions, shape, etc.) from image data representing the item 106 involved in the event 110, and so forth. The feature-extraction component 134 may provide the various feature data, or event data, as input into the algorithm cascade 126.

Additionally, a set of item identifiers (IDs) 136A may be used as inputs by the algorithms in the algorithm cascade 126. In some examples, the set of item IDs 136A may include identifiers for each item 106 offered for acquisition by users 108 in the facility 102 (e.g., names of items 106, numeric IDs for the items 106, etc.), and additional item representation data for each item 106. For instance, the set of item IDs 136A may include or be associated with item representations for each item 106, such as a location of each item 106 in the facility, a weight of each item 106, text on each item 106, features of each item 106 (e.g., color, texture, dimensions, shape, etc.), and/or other data. The set of item IDs 136A and associated data may be input into the algorithm cascade 126 along with feature data for the item 106 involved in the event 110 at issue.

Generally, the each of the algorithms in the algorithm cascade 126 may utilize one or more of various types of algorithm data 138 to identify the item 106 in the event 110, and/or narrow the search field of the item IDs 136. The algorithm data 138 may include one or more of location data that specifies a location in the facility 102 of the respective item 106, weight data that indicates a weight of the respective item 106, shopping list data indicating item IDs 136 that are included in a virtual shopping list of a user of the tote 104 (e.g., obtained from shopping list application on a user device), shopping history data that indicates item IDs 136 of items 106 that the user of the tote 104 has previously purchased, and/or text data indicating text that is written or printed on the items 106, containers of the items 106, and/or labels of the items 106. Further, the algorithm data 138 may include barcode data that indicates barcodes for the items 106 to help identify what item 106 was placed in the tote 104. Additionally, the algorithm data 138 may include environment feature data for item IDs 136 that includes feature data for an environment around the tote 104 that may be represented in image data generated by outward-facing cameras on the totes 104.

Each algorithm may utilize algorithm data 138 for each item ID 136 and compare the data with that of the feature data or event data for the item 106 involved in the event 110. For instance, the $1^{st}$ algorithm 128 may analyze location data that indicates a location in the facility 102 at which the event 110 occurred, and compare that location data to location data associated with each of the set of item IDs 136A. The $1^{st}$ algorithm 128 may output a first subset of item IDs 136B that includes item IDs 136 for items 106 that are stored in the facility within a threshold distance to the location at which the event 110 occurred. In this way, the $1^{st}$ algorithm may narrow the search space to include items 106 that are near a user (e.g., within 5 feet, within 10 feet, in the same aisle, within two aisles, etc.) because users 108 are more likely to select items 106 in closer proximity to them and their totes 104 as they move through a facility 102. However, the $1^{st}$ algorithm 128 may utilize any type of algorithm data 138 and/or algorithms to determine whether the set of item IDs 136A correspond to the item 106 involved in the event 110.

After the $1^{st}$ algorithm 128 outputs the subset of item IDs 136B, a $2^{nd}$ algorithm 130 may be applied to further narrow the search space from the subset of item IDs 136B to a smaller subset of item IDs 136(N). Generally, the $2^{nd}$ algorithm may be a more "expensive" algorithm meaning the amount of computing resources, time, and/or battery power required to compare data of each item ID 136 with data associated with the event 110 involving the item 106 in question is higher than that required for the $1^{st}$ algorithm 128. For instance, the $2^{nd}$ algorithm 130 may analyze image data generated by a camera on the tote 104 and/or a camera 116 in the facility 102 and determine or extract text data from the image data that represents text on the item 106. The $2^{nd}$ algorithm 130 may then compare that text data associated with text on the item 106 with respective text data for each of the subset of item IDs 136B. The $2^{nd}$ algorithm 130 may determine which of the subset of item IDs 136B is associated with respective text data that matches to the text data associated with the item 106 by more than a threshold amount (e.g., 30% match, 50% match, etc.). The threshold may be varied or determined based on various factors, such as occlusion due to a hand/clothing of the user 108, the preciseness of the text-extraction method utilized, the lighting on the item, and so forth. The $2^{nd}$ algorithm 130 may then output a smaller subset of item IDs 136(N) that represent items 106 with more than a threshold amount of similarity between text that is on the items 106. In some instances, the $2^{nd}$ algorithm 130 may determine which of the item IDs 136 correspond to the item 106 in the event 110 with high enough confidence that the tote-management system 124 may simply select that item IDs 136 and cause a virtual-tote component 142 to update a virtual listing 144 indicating all the items 106 selected by the user 108 thus far during their session.

However, the algorithm cascade 126 may include an Nth algorithm 132, where "N" is any integer greater than 2, to further analyze smaller subsets of item IDs 136 until a final item ID 136 is selected. For instance, the Nth algorithm 132 may be a more "expensive" algorithm compared to the $2^{nd}$ algorithm 130. As an example, the Nth algorithm 132 may extract feature data from the image data representing the item 106 and compare that feature data with respective feature data associated with each of the subset of item IDs 136(N). The Nth algorithm 132 may select, from the subset of item IDs 136(N), an item ID 136 that corresponds most strongly to the item 106 (e.g., highest confidence value). In some instances, each of the algorithms in the cascade 126 may generate and/or determine confidence values for the item IDs 136 such that each item ID "carries" a confidence value with it through the cascade 126. As the item IDs 136 move through the cascade, those with confidence values that are lower than a threshold (e.g., 50% confidence value, 70% confidence, etc.) may be pruned from the item IDs 136. However, the selected item ID 140 may be selected based on a confidence value that is weighted by, or takes into account, the results of each algorithm in the cascade 126. In this way, each of the algorithms 126 may have a say, or help identify, the selected item ID 140.

Although various algorithms have been described herein, the algorithm cascade 126 may generally include any two algorithms described herein, in any order. For instance, in addition to, or in lieu of the listed algorithms, the algorithm cascade may include other types of algorithms. For instance, one of the algorithms may analyze shopping list data to determine confidence levels for the item IDs 136 as corresponding to the depicted item 106. The user 108 may provide the tote-management system 124 with access to a virtual shopping list, and at least one of the algorithms may determine whether any of the item IDs 136 correspond to an item ID 136 in the shopping list data. Item IDs 136 that are included in the shopping list data for the user 108, and not already included in the virtual listing 144, may be given higher confidence scores and/or selected for a narrower subset of item IDs 136.

Additionally, an algorithm in the cascade 126 may analyze weight data for each of the item IDs 136 as well as weight data for the item 106 placed in the tote 104. The algorithm may identify which item IDs 136 have weight data indicating that the corresponding items 106 are within a threshold weight of the item 106 (e.g., within 80% of the weight, within 90% of the weight, etc.), and/or have weight data indicating a factor or multiple of the weight of the item or items 106 placed in the tote 104 (e.g., indicating multiple items 106 were placed in the tote 104). The algorithms may select a subset of the item IDs 136 based on the item IDs 136 in the subset representing items 106 with weight data that corresponds to the weight of the item 106 as indicated by a scale included in the tote 104.

As another example, an algorithm in the cascade 126 may take into account shopping history data. The shopping history data may indicate item IDs 136 that the user 108 has selected in previously shopping sessions, or other users 108 in the facility 102. Previously selected items 106 may indicate that the user 108 often desires this item 108, or that an item 106 is generally popular with users 108 of the facility 102. The algorithm may determine which of the item IDs 136 are included in the shopping history data such that the user 108 has previously selected corresponding items 106, and/or the corresponding items 106 are popular with other users 108 in the facility 102. The algorithm may then select those item IDs 136 to be in a narrower subset of item IDs 136, and/or increase the confidence values for those item IDs 136 included in the shopping history data.

As a further example, an algorithm may utilize environment-feature data that generally represents features of an environment around the tote 104. For instance, the tote 104 may include one or more outward facing cameras that generate image data representing the environment exterior the tote 104. The algorithm may extract feature data from the environment and identify various data from the environment, such as text on items near the tote 104, feature data for the items 106 near the tote (e.g., color, dimensions, shape, amount of text, etc.), and/or other data. The algorithm may analyze the environment feature data to determine information about items 106 around the tote 104, and/or item IDs 136 for items 106 around the tote 104. The algorithm may then determine a subset of the item ID 136, and or increase confidence values for item IDs 136, that have respective feature data that corresponds to the environment feature data representing items 106 around the tote 104. In some instances, the environment feature data may represent text on advertisements, aisle signs, and/or other text in the environment of the tote 104 that is helpful to rank item IDs 136. For instance, the image data may represent a sign that lists items for an aisle. For instance, if the sign says the aisle stores "condiments," then the item IDs 136 that have text data indicating they are condiments (e.g., ketchup, mustard, etc.) may have their confidence scores increase and/or be selected for a narrower subset of item IDs 136.

Once the selected item ID 140 is identified by the algorithm cascade 126, the virtual-tote component 142 may update the virtual listing 144 for the tote 104 using the selected item ID 140 to help track the items 106 selected by the user 108 as they move through the facility 102. In some instances, the virtual-tote component 142 may also present a price of the item 106 for the selected item ID 140 (e.g., store the prices locally in memory of the tote 104, communicate periodically with the server(s) 120 to send the selected item ID 140 and receive the price, etc.). The virtual listing 144 may then be presented on a display associated with the tote 104, and/or by an application executing on a personal user device of the user 108. In the illustrated example, the user 108 selected "1 Peanuts" which is shown in the virtual listing 144 as being $8.99. By showing a user 108 a cost for each item 106, and potentially a total cost of all the items 106 in the tote 104, the user 108 may decide to buy more items 106, or return items 106.

Once the user 108 has finished their shopping session, the user 108 may end the shopping session in various ways. For instance, the user 108 may return the tote 104 to the tote corral or other storage location, provide input to the tote 104 indicating an end of the shopping session (e.g., utterance, utilize a user interface element on a touch display, etc.), or simply remove item bags or other item carriers from the tote 104 and leave the facility 102. After the user 108 has ended their shopping session, the virtual listing 144 of item IDs 136 in the virtual item listing may be uploaded to one or more remote servers 120, over one or more networks 122, that manage user accounts for users 108 of the facility 102. The server(s) 120 may charge the appropriate user account for the items 106 in the virtual listing 144 that the user 108 took from the facility 102. For instance, the server(s) 120 may be configured to determine or generate information indicative of a cost of the items 106 picked by the user 108, including the appropriate tax. Additionally, the server(s) 120 may store payment information (e.g., credit card information, bank account information, etc.) for each user account. In this way, when the user 108 finished their shopping session and the tote 104 sends the listing 144 of item IDs 136 over the network(s) 122 to the server(s) 120, the server(s) 120 may be configured to determine a cost or price for all of the listed item IDs 136, and charge the user 108 via their payment information for the items 106 selected during their shopping session. In this way, the user 108 need not go through steps of a traditional check-out experience (e.g., waiting in line for a cashier, scanning items with the cashier, paying for items at the cashier, etc.).

The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite, etc.), or other connection technologies.

The tote 104 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 122 according to the type of protocol or standard being used. As noted above, in some examples, the servers 120 may perform some or all of the operations described below as being performed by the tote 104. While the servers 120 are illustrated as being in a location outside of the facility 102, in other implementations, at least a portion of the servers 122 may be located at the facility 102.

Figure 2:
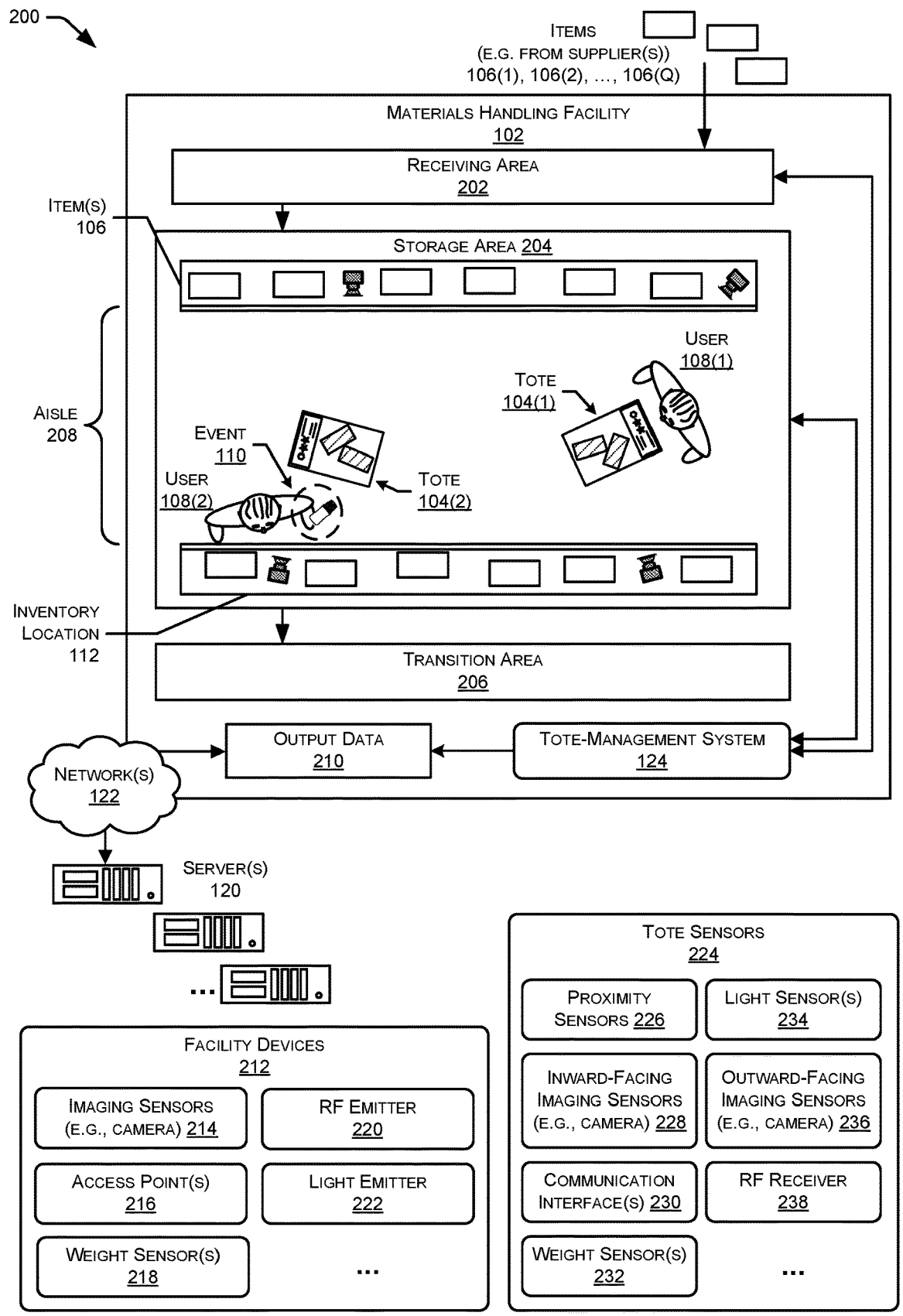
FIG. 2 is a block diagram of an example materials handling facility that includes item-identifying totes, facility and tote sensors, and a tote management system configured to generate output regarding events occurring in the tote using sensor data.

FIG. 2 is a block diagram 200 of an example materials handling facility 102 that includes item-identifying totes 104, facility and tote sensors, and a tote-management system 124 configured to generate output regarding events occurring in the tote 104 using sensor data. However, the following description is merely one illustrative example of an industry and environment in which the techniques described herein may be utilized.

An implementation of a materials handling facility 102 configured to store and manage inventory items is illustrated in FIG. 2. A materials handling facility 102 (facility) comprises one or more physical structures or areas within which one or more items 106(1), 106(2), ..., 106(Q) (generally denoted as 106) may be held. As used in this disclosure, letters in parenthesis such as "(Q)" indicate an integer result. The items 106 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 202, a storage area 204, and a transition area 206. The receiving area 202 may be configured to accept items 106, such as from suppliers, for intake into the facility 102. For example, the receiving area 202 may include a loading dock at which trucks or other freight conveyances unload the items 106.

The storage area 204 is configured to store the items 106. The storage area 204 may be arranged in various physical configurations. In one implementation, the storage area 204 may include one or more aisles 208. The aisles 208 may be configured with, or defined by, inventory locations 112 on one or both sides of the aisle 208. The inventory locations 112 may include one or more of shelves, racks, cases, cabinets, bins, floor locations, or other suitable storage mechanisms for holding or storing the items 106. The inventory locations 112 may be affixed to the floor or another portion of the facility's structure, or may be movable such that the arrangements of aisles 208 may be reconfigurable. In some implementations, the inventory locations 112 may be configured to move independently of an outside operator. For example, the inventory locations 112 may comprise a rack with a power source and a motor, operable by a computing device to allow the rack to move from one location within the facility 102 to another.

One or more users 108(1), 108(2), ..., 108(U), totes 104(1), 104(2), ..., 104(T) (generally denoted as 104) or other material handling apparatus may move within the facility 102. For example, the users 108 may move about within the facility 102 to pick or place the items 106 in various inventory locations 112, placing them on the totes 104 for ease of transport. An individual tote 104 is configured to carry or otherwise transport one or more items 106. For example, a tote 104 may include a basket, a cart, a bag, and so forth. In other implementations, other agencies such as robots, forklifts, cranes, aerial drones, and so forth, may move about the facility 102 picking, placing, or otherwise moving the items 106.

One or more sensors may be configured to acquire information in the facility 102. The sensors in the facility 102 (e.g., facility devices 212) may include sensors fixed in the environment (e.g., ceiling-mounted cameras) or otherwise, such as sensors in the possession of users (e.g., mobile phones, tablets, etc.) or sensors mounted on the totes 104 (e.g., tote sensors 224). The facility sensors 212 may include imaging sensors 214 (e.g., cameras), weight sensor(s) 218, and/or other sensors. The tote sensors 224 may include proximity sensors 226 to detect items 106 being placed in the tote 104, inward-facing imaging sensors 228 to identify items 106 being placed in the tote, communication interfaces 230, weight sensors 232 (e.g., in the bottom of the tote), light sensors 234, outward facing sensors 236, radio frequency (RF) 238, temperature sensors, humidity sensors, vibration sensors, and so forth. The sensors may be, in some examples, in or on the tote 104 or another location in the facility 102. In one example, the bottom of the totes 104 may include weight sensors configured to determine a weight of the items 106 placed thereupon.

During operation of the facility 102, the sensors may be configured to provide information suitable for identifying the movement of items 106 or other occurrences within the tote 104. For example, a series of images acquired by a camera 228/236 may indicate removal of an item 106 from a particular tote 104 by one of the users 108 and/or placement of the item 106 on or at least partially within one of the totes 104.

While the storage area 204 is depicted as having one or more aisles 208, inventory locations 112 storing the items 106, sensors, and so forth, it is understood that the receiving area 202, the transition area 206, or other areas of the facility 102 may be similarly equipped. Furthermore, the arrangement of the various areas within the facility 102 is depicted functionally rather than schematically. For example, multiple different receiving areas 206, storage areas 208, and transition areas 210 may be interspersed rather than segregated in the facility 102.

The totes 104 may include, or be coupled to, a tote-management system 124. The tote-management system 124 is configured to identify interactions with and between users 108 and totes 104, in one or more of the receiving area 202, the storage area 204, or the transition area 206. These interactions may include one or more events 110. For example, events 110 may include placing of an item 106 in a tote 104, returning of an item 106 from the tote 104 to an inventory location 112, and so forth. Other events 110 involving users 108 may include the user 108 providing authentication information in the facility 102, using a computing device at the facility 102 to authenticate identity to the tote-management system 124, and so forth.

By determining the occurrence of one or more of the events 110, the tote-management system 124 may generate output data 210. The output data 210 comprises information about the event 110. For example, where the event 110 comprises an item 106 being removed from, or placed in, a tote 104, the output data 210 may comprise an item identifier indicative of the particular item 106 that was removed from, or placed in, the tote 104, a quantity of the item 106, a user identifier of a user that removed the item 106, and/or other output data 210.

The tote-management system 124 may use one or more automated systems to generate the output data 210. For example, an artificial neural network, one or more classifiers, or other automated machine learning techniques may be used to process the sensor data and/or image data from the one or more sensors to generate output data 210. The automated systems may operate using probabilistic or non-probabilistic techniques. For example, the automated systems may use a Bayesian network. In another example, the automated systems may use support vector machines to generate the output data 210 or the tentative results. The automated systems may generate confidence level data that provides information indicative of the accuracy or confidence that the output data 210 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 35%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 106 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 108 may pick an item 106(1) such as a peanut bottle that is generally cylindrical in shape from the inventory location 112. Other items 106 at nearby inventory locations 112 may be predominately spherical. Based on the difference in shape (cylinder vs. sphere) from the adjacent items, and the correspondence in shape with the previously stored image of the peanut bottle item 106(1) (cylindrical and cylindrical), the confidence level that the user 108 has picked up the peanut bottle item 106(1) is high.

In some situations, the automated techniques may be unable to generate output data 210 with a confidence level above a threshold result. For example, the automated techniques may be unable to distinguish which item 106 in large a group of items a user 108 has picked up from the inventory location 112 and placed in the tote 104. In other situations, it may be desirable to provide human confirmation of the event 110 or of the accuracy of the output data 210. For example, some items 106 may be deemed age restricted such that they are to be handled only by users 108 above a minimum age threshold.

In instances where human confirmation is desired, sensor data associated with an event 110 may be processed to generate inquiry data. The inquiry data may include a subset of the sensor data associated with the event 110. The inquiry data may also include one or more of one or more tentative results as determined by the automated techniques, or supplemental data. The subset of the sensor data may be determined using information about the one or more sensors. The subset of the sensor data may include images that may show the item 106 being placed in, or removed from, the tote 104. The subset of the sensor data may also omit images from other cameras that did not have that item 106 in the field of view. The field of view may comprise a portion of the scene in the tote 104 that the camera is able to generate sensor/image data about.

Continuing the example, the subset of the sensor data may comprise a video clip acquired by one or more cameras having a field of view that includes the item 106. The tentative results may comprise the "best guess" as to which items 106 may have been involved in the event 110. For example, the tentative results may comprise results determined by the automated system that have a confidence level above a minimum threshold.

The facility 102 may be configured to receive different kinds of items 106 from various suppliers and to store them until a customer orders or retrieves one or more of the items 106. A general flow of items 106 through the facility 102 is indicated by the arrows of FIG. 2. Specifically, as illustrated in this example, items 106 may be received from one or more suppliers, such as manufacturers, distributors, wholesalers, and so forth, at the receiving area 202. In various implementations, the items 106 may include merchandise, commodities, perishables, or any suitable type of item 106, depending on the nature of the enterprise that operates the facility 102. The receiving of the items 106 may comprise one or more events 110 for which the tote management system 124 may generate output data 210.

Upon being received from a supplier at receiving area 202, the items 106 may be prepared for storage. For example, items 106 may be unpacked or otherwise rearranged. An inventory management system of the facility 102 may include one or more software applications executing on a computer system to provide inventory management functions based on the events 110 associated with the unpacking or rearrangement. These inventory management functions may include maintaining information indicative of the type, quantity, condition, cost, location, weight, or any other suitable parameters with respect to the items 106. The items 106 may be stocked, managed, or dispensed in terms of countable, individual units or multiples, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 202, items 106 may be stored within the storage area 204. In some implementations, like items 106 may be stored or displayed together in the inventory locations 112 such as in bins, on shelves, hanging from pegboards, and so forth. In this implementation, all items 106 of a given kind are stored in one inventory location 112. In other implementations, like items 106 may be stored in different inventory locations 112. For example, to optimize retrieval of certain items 106 having frequent turnover within a large physical facility 102, those items 106 may be stored in several different inventory locations 112 to reduce congestion that might occur at a single inventory location 112.

When a customer order specifying one or more items 106 is received, or as a user 108 progresses through the facility 102, the corresponding items 106 may be selected or "picked" from the inventory locations 112 containing those items 106. In various implementations, item picking may range from manual to completely automated picking. For example, in one implementation, a user 108 may have a list of items 106 they desire and may progress through the facility 102 picking items 106 from inventory locations 112 within the storage area 204, and placing those items 106 into a tote 104. In other implementations, employees of the facility 102 may pick items 106 using written or electronic pick lists derived from customer orders. These picked items 106 may be placed into the tote 104 as the employee progresses through the facility 102. Picking may comprise one or more events 110, such as the user 108 in moving to the inventory location 112, retrieval of the item 106 from the inventory location 112, and so forth.

After items 106 have been picked, they may be processed at a transition area 206. The transition area 206 may be any designated area within the facility 102 where items 106 are transitioned from one location to another or from one entity to another. For example, the transition area 206 may be a packing station within the facility 102. When the item 106 arrives at the transition area 206, the items 106 may be transitioned from the storage area 204 to the packing station. Information about the transition may be maintained by the tote management system 124 using the output data 210 associated with those events 110.

In another example, if the items 106 are departing the facility 102 a list of the items 106 may be used by the tote management system 124 to transition responsibility for, or custody of, the items 106 from the facility 102 to another entity. For example, a carrier may accept the items 106 for transport with that carrier accepting responsibility for the items 106 indicated in the list. In another example, a customer may purchase or rent the items 106 and remove the items 106 from the facility 102.

The tote-management system 124 may access or generate sensor data about the items 106, the users 108, the totes 104, and so forth. The sensor data may be acquired by one or more of the sensors, data provided by other systems, and so forth. For example, the sensors may include cameras configured to acquire image data of items 106 placed in the totes 104. The image data may comprise still images, video, or a combination thereof. The image data may be processed by the tote management system 124 to determine an item identifier for the items 106, a listing of items in the tote 104 for a user 108, and so forth. As used herein, the identity of the user of a tote 104 may represent a unique identifier of the user (e.g., name, number associated with user, username, etc.), an identifier that distinguishes the user amongst other users being identified with the environment, or the like.

The tote-management system 124, or systems coupled thereto, may be configured to identify the user 108. In one implementation, this determination may comprise comparing sensor data with previously stored identity data. For example, the user 108 may be identified by showing their face to a facial recognition system, by presenting a token carrying authentication credentials, providing a fingerprint, scanning a barcode or other type of unique identifier upon entering the facility, and so forth. Identity of the user 108 may be determined before, during, or after entry to the facility 102 and/or interaction with a tote 104. Determination of the user's 216 identity may comprise comparing sensor data associated with the user 108 in the facility 102 and/or with the tote 104 to previously stored user data. In some examples, the output data 210 may be transmitted over a network 226 to server(s) 120.

Figure 3A:
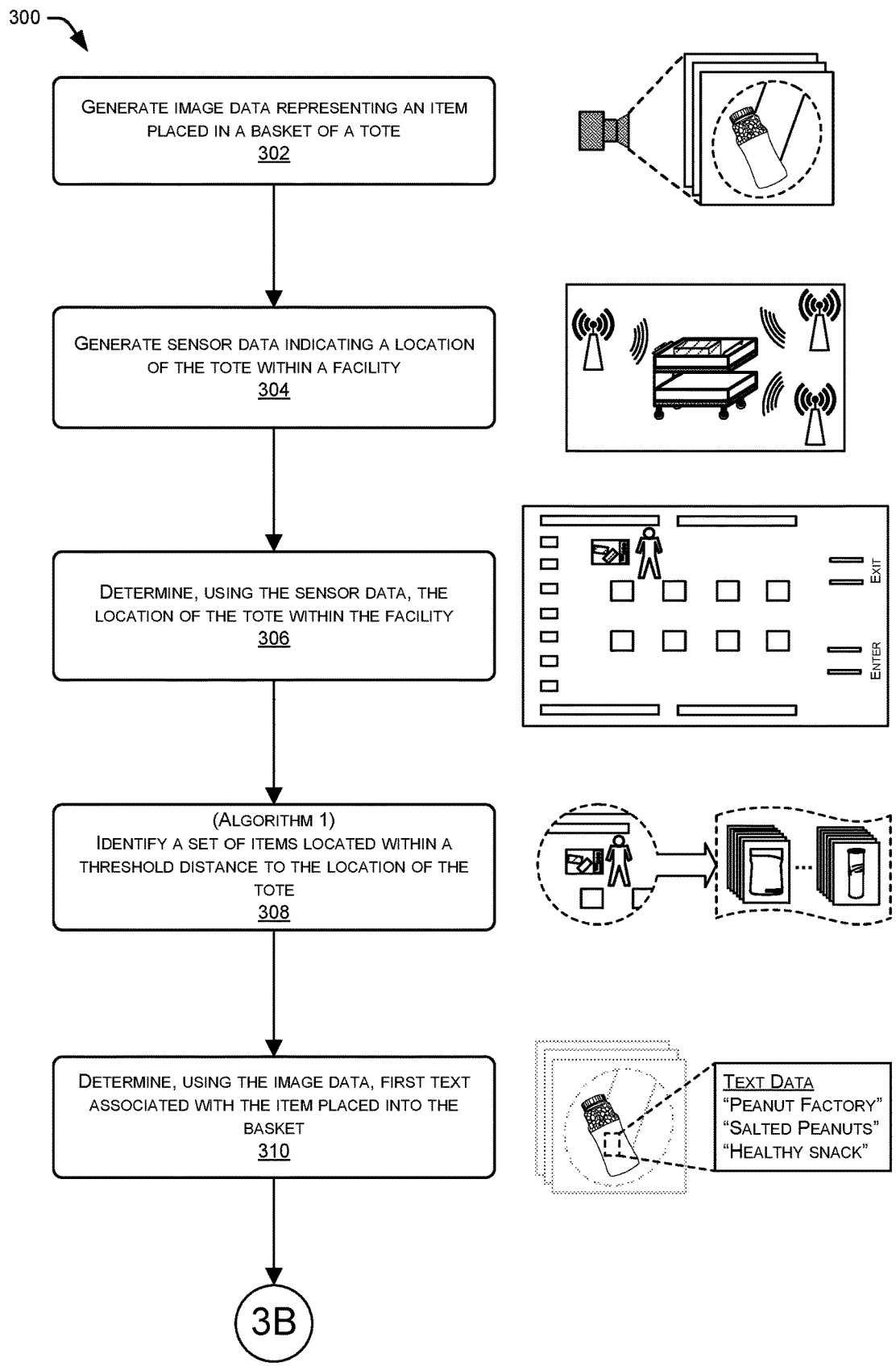
FIGS. 3A and 3B illustrate a flow diagram of an example process for an item-identifying tote to implement cascading algorithms that use a location of the tote, text on the item, and features of the item to automatically identify items placed in the tote.
Figure 3B:
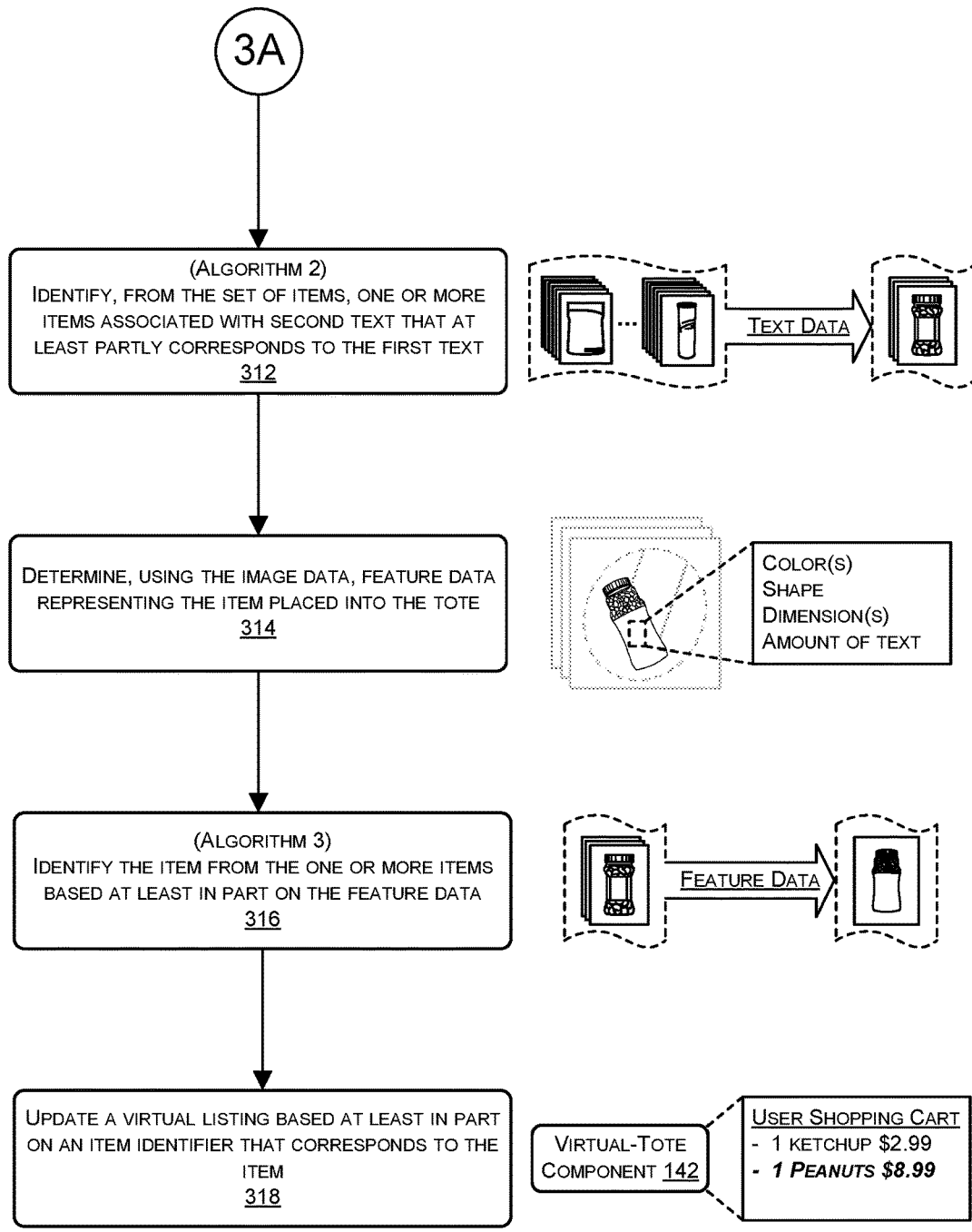

FIGS. 3A and 3B illustrate a flow diagram of an example process 300 for an item-identifying tote 104 to implement cascading algorithms that use a location of the tote, text on the item, and features of the item to automatically identify items placed in the tote.

At 302, the tote 104 may generate, using an imaging sensor 228/236, image data representing an item 106 placed in the tote 106. In some examples, the image data may be data generated by a camera that includes multiple images depicting a two-dimensional view of a field of view of the camera. In other examples, the image data may comprise a three-dimensional (3D) model or representation that includes the item 106.

At 304, the tote may generate sensor data indicating a location of the tote 104 within a facility 102. For instance, a WiFi sensor/receiver, Bluetooth sensor/receiver, RF receiver, etc., may generate sensor data that can be utilized to determine a location of the tote 104 in the facility 102 (e.g., WiFi triangulation, beaconing, location-specific RF IDs, etc.).

At 306, the tote 104 may determine, using the sensor data, the location of the tote 104 within the facility 102. For instance, the tote 104 may determine a X-Y location of the tote 104 in the facility 102 based on a predefined grid. Additionally, or alternatively, the tote 104 may determine an aisle or other inventory location 112 that the tote 104 is near.

At 308, the tote 104 may perform a first algorithm to identify a set of items located within a threshold distance to the location of the tote 104. For instance, the tote 104 may store a planogram for the facility 102, or a diagram or model that indicates the placement of items 106 on inventory locations 112. The tote 104 may determine, using the location of the tote 104 and the planogram, the set of items located within the threshold distance to the location of the tote 104 (e.g., same aisle, within 10 feet, etc.).

At 310, the tote 104 may determine, using the image data, first text associated with the item 106 placed into the tote 104. For instance, the tote 104 may analyze the image data using any known extraction technique, such as OCR, to identify first text associated with the item 106.

At 312, the tote 104 may perform a second algorithm to identify, from the set of items, one or more items associated with second text that at least partly corresponds to the first text. As an example, the tote 104 may utilize a gallery of item representations and compare the first text data with respective text data associated with the set of items. The tote 104 may determine that the one or more items associated with the second text have text that at least partly matches to the first text of the item (e.g., more than 30% match, more than 50%, match, etc.).

At 314, the tote 104 may determine, using the image data, feature data representing the item placed into the tote 104. For instance, the tote 104 may analyze the image data using any extraction technique to identify feature data, such as a color of the item 106, color scheme of the item 106, texture of the item 106, dimensions/shape of the item 106, and/or any other feature data.

At 316, the tote 104 may perform a third algorithm to identify the item from the one or more items based at least in part on the feature data. As an example, the tote 104 may compare the feature data, which may be numeric representations of the features of the item 106 (e.g., feature vectors) with respective feature data associated with each of the one or more items. The tote 104 may determine which of the one or more items is associated with feature data that matches or corresponds most strongly with the feature data that was extracted/identified from the image data representing the item 106.

At 318, the tote 104 may update a virtual listing representing items previously placed in the tote 104 based at least in part on an item identifier that corresponds to the item. For instance, the tote 104 may add an item identifier for the item 106 to a virtual shopping list for the user 108 that lists or indicates the items 106 that the user 108 has previously placed in the tote 104.

FIG. 4 illustrates an example gallery 400 of item representations 402 of items offered for acquisition in a materials handling facility 102. Generally, each of the item representation 402 may include data that represents various characteristics or descriptors for the associated physical item 106. For instance, each item representation 402 may include or represent one or more of location data 404 indicating a location of the corresponding item 106 in the facility 102, text data 406 representing text that is printed or written on the corresponding item 106, feature data 408 representing physical features (e.g., color, shape, dimension, amount of text, etc.) of the correspond item 106, weight data 410 indicating a weight value for the corresponding item 106, shopping data 412 indicating various shopping information for the corresponding item 106 (e.g., popular item 106, included on a shopping list of the user 108, previously purchased by the user 108, etc.), and barcode data 414 indicating a barcode for the items 106 (e.g., an optical, machine-readable representation of data).

The feature data 408 may comprise various types of feature data 408 determined using one or more techniques, such as various machine-learning algorithms. The feature data 408 may include learned global features representing features of items 106 as illustrated in image data. For instance, learned global features may comprise a robust way of describing the items 106 where a set of descriptors (e.g., convolution neural network features) are extracted from image data representing the item 106, and those descriptors are matched, by an algorithm, to respective descriptors in the gallery 400.

As another example, the feature data 408 may include handcrafted midlevel features, which may be faster to compute or determine compared to learned midlevel features. The handcrafted features may capture local and midlevel properties of the items 106, and these methods (e.g., SIFT) may be used by an algorithm to identify an "interesting" region in an image. These key-points may then be represented by extracting handcrafted features based on, for example, local gradient and texture properties. One or more constraints may enforce invariances to scale, rotation, and illumination for image data representing items 106.

As a further example, the feature data 408 may include learned midlevel features to, for instance, help distinguish between look-a-like products. Generally, an algorithm may extract learned midlevel features by computing both feature locations on an item 106 and feature representation to perform image identification using data structures, such as inverted indexing. Because the features are learned from image data, they may focus their attention on cues that are useful to distinguish different kinds of items 106. In some examples, both the feature detectors and descriptors may be trained in a discriminative fashion to learn local to midlevel image properties. In one examples, an attentive local feature descriptor may be utilized that is suitable for large-scale image retrieval (e.g., DEep Local Feature (DELF)). This feature may be based on convolution neural networks (CNNS) which are trained using image-level annotations on a landmark image dataset. These are merely a few examples of the types of feature data 408 that may be utilized by one or more algorithms described herein that compare feature data 408 for image data representing an item 108 with feature data 408 in the item representations 402 in the gallery 400.

Figure 5:
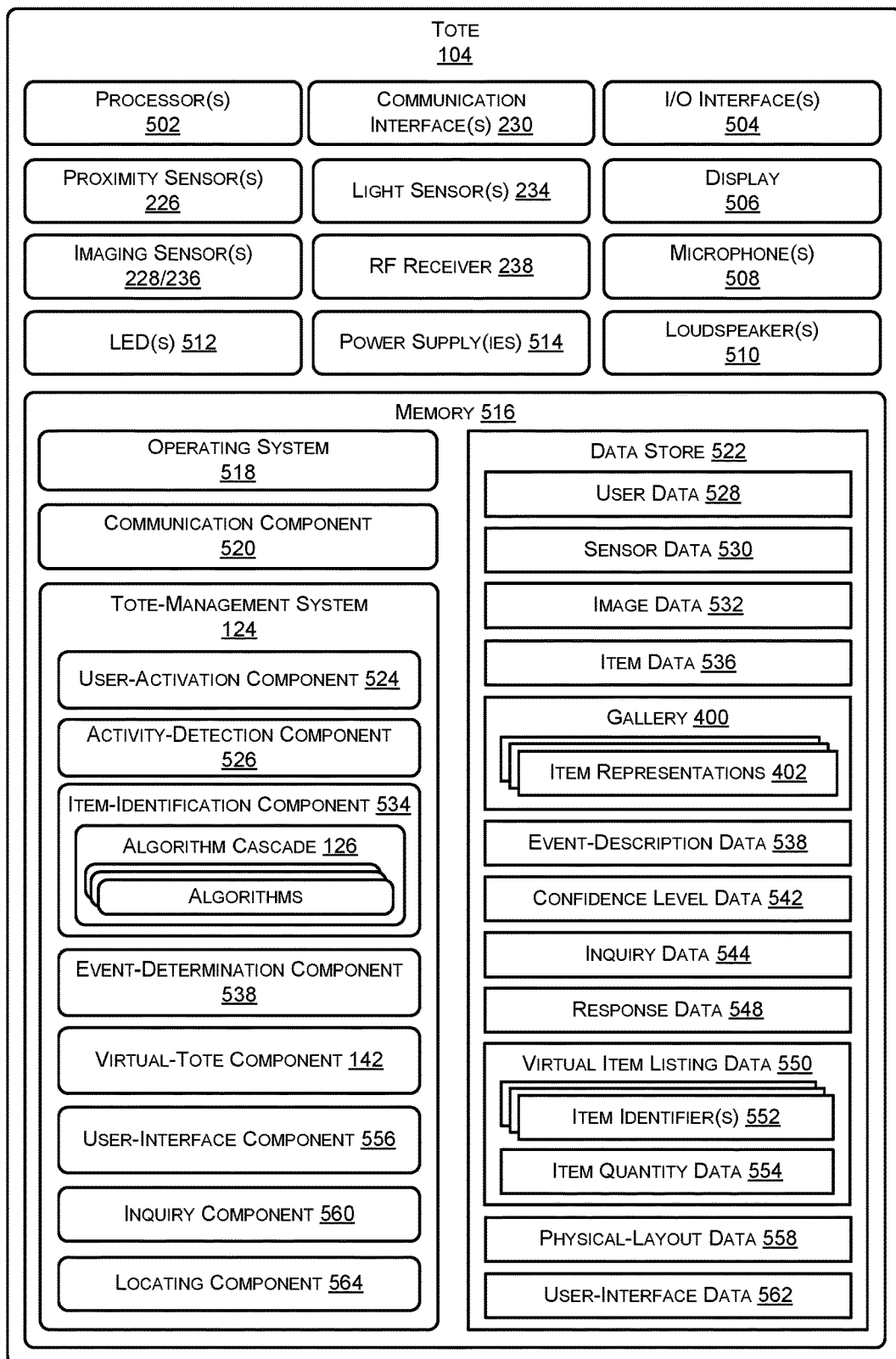
FIG. 5 illustrates example components of an item-identifying tote configured to support at least a portion of the functionality of a tote management system.

FIG. 5 illustrates example components of an item-identifying tote 104 configured to support at least a portion of the functionality of a tote management system.

The tote 104 may include one or more hardware processors 502 (processors) configured to execute one or more stored instructions. The processors 502 may comprise one or more cores. The tote 104 may include one or more input/output (I/O) interface(s) 504 to allow the processor 502 or other portions of the tote 104 to communicate with other devices. The I/O interfaces 504 may comprise Inter-Integrated Circuit (I2C), Serial Peripheral Interface bus (SPI), Universal Serial Bus (USB) as promulgated by the USB Implementers Forum, and so forth. The I/O interfaces 504 may allow the various modules/components of the tote 104 to communicate with each other and/or control each other.

The tote 104 may also include one or more communication interfaces 230. The communication interfaces 230 are configured to provide communications between the tote 104 and other devices, such as the server(s) 120, sensors, interface devices, routers, and so forth. The communication interfaces 230 may include devices configured to couple to personal area networks (PANs), wired and wireless local area networks (LANs), wired and wireless wide area networks (WANs), and so forth. For example, the communication interfaces 230 may include devices compatible with Ethernet, Wi-Fi™, Bluetooth®, and so forth. The tote 104 may also include one or more busses or other internal communications hardware or software that allow for the transfer of data between the various modules and components of the tote 104.

The tote 104 may also include one or more proximity sensors 508, a camera (or other imaging device 228/236), and one or more LEDs 512. The proximity sensor(s) 508 may comprise any type of sensor that is able to detect the presence of nearby objects without the need for physical contact (e.g., ToF sensors, PIR sensors, etc.). The cameras 510 in each of the capture assemblies 134 may comprise any type of camera or imaging device configured to generate image data (and/or video data), or information descriptive of a plurality of picture elements or pixels. The LED(s) 512 may be selectively activated to emit light at any wavelength, visible or non-visible to users 108.

The tote 104 may include one or more power supply(ies) 514 to provide power to the components of the tote 104. The power supply(ies) 514 may also include a secondary (e.g., internal) power supply 518 to allow for hot swapping of battery pack modules, such as one or more capacitors, internal batteries, etc.

The tote 104 may also include a display 506 configured to display image data, such as pictures, videos, user interface elements, and/or any other image data. The display 506 may comprise any type of display 506, and may further be a touch screen to receive touch input from a user 108. The tote 104 may also include one or more microphones 520 and one or more loudspeakers 522 to facilitate a dialogue with a user 108, and/or to receive feedback from the user 108. The microphone(s) 520 may capture sound representing the user's speech, and the loudspeaker(s) 522 may output machine-generated words to facilitate a dialogue, prompt a user 108 for feedback on an item 106 and/or for other information, and/or output other alerts or notifications.

The tote 104 may include one or more memories 516 (e.g., in an electronics box module along with the processor (s) 502). The memory 516 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 516 provides storage of computer-readable instructions, data structures, program modules, and other data for the operation of the tote 104. A few example functional modules are shown stored in the memory 516, although the same functionality may alternatively be implemented in hardware, firmware, or as a system on a chip (SOC).

The memory 516 may include at least one operating system (OS) component 518. The OS component 518 is configured to manage hardware resource devices such as the I/O interfaces 504, the communication interfaces 230, and provide various services to applications or components executing on the processors 502. The OS component 518 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 516. These components may be executed as foreground applications, background tasks, daemons, and so forth. A communication component 520 may be configured to establish communications with one or more of the sensors, one or more of the servers 120, or other devices. The communications may be authenticated, encrypted, and so forth.

The memory 516 may further store a tote management system 124. The tote management system 124 is configured to provide the item-identifying functions (and other functions) provided by the tote 104 as described herein. For example, the tote-management system 124 may be detect items 106, identify items 106, and maintain a virtual item listing for a user 108 of the tote 108.

The tote-management system 124 may include a user-activation component 524 that performs operations for activating a shopping session using a tote 104 on behalf of a user 108. For instance, a user 108 may have previously registered for a user account with an operator of the facility to utilize various automated management services provided by an operator of the facility 102. The user 108 may have registered for a user account, such as by providing user data 528, to automate payments made for items taken by the user and included a payment means (e.g., credit card, bank account number, etc.), and may have also provided an identification means in the user data 528 to the user-activation component 524 such that the tote 104 can recognize the user 108. For instance, the user 108 may have registered to identify themselves to the tote 104 using any identification technique by the user-activation component 524, such as by providing user data 528 by presenting an identification means to a camera/scanner 228 (e.g., presenting a driver's license, presenting a facility-issued card, presenting a user identifier via a mobile phone, etc.), speaking a predefined utterance that is captured by the microphone(s) 508 (e.g., a name of the user, a predefined keyword, etc.), and/or looking into a camera 228/236 for facial recognition. Once a user 108 has identified themselves to using the user-activation component 524, the user-activation component 524 may open a shopping session where the tote 104 identifies and track items 106 retrieved by the user 108 and placed in the tote 104.

The tote-management system 124 may additionally include an activity-detection component 526 configured to detect items 106 (or objects) within a particular proximity to the tote. For example, one or more proximity sensor(s) 508 may generate sensor data 530 that indicates a distance between the proximity sensor(s) 226 and any objects located in the FOV of the proximity sensor(s) 228/236. The activity-detection component 526 may analyze the sensor data 530 and determine if an object is within a threshold distance indicating that the object is near the tote 104 and/or within or near the perimeter of the top of the tote 104 (e.g., one foot from the proximity sensor(s) 226, two feet from the proximity sensor(s) 226, etc.). In this way, the proximity sensor(s) 226 may generate sensor data 530 that indicates whether or not an item 106 is being moved in or out of the tote 104. However, in some examples, rather than using sensor data 530 generated by a proximity sensor(s) 226, the activity detection component 526 may utilize image data 532 generated by the camera(s) 228/236 to determine if an object is within a threshold distance from the tote 104.

The tote-management system 124 may further include a strobing component configured to cause the LED(s) 512 and/or shutters of the camera(s) 228 to strobe according to different frequencies. As noted above, the LED(s) 512 may emit light in any light spectrum (e.g., infrared, near infrared, visible, etc.). However, some items 106 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 512 to emit light in the visible spectrum. When generating image data 532 using camera(s) 228/236, motion blur may appear when capturing fact moving objects. However, the motion blur may be reduced or eliminated by exposing the camera(s) 228/236 imager for a short (e.g., sub-millisecond) durations. Accordingly, the strobing component may strobe the opening and closing of shutters of the camera(s) 228/236 to limit the sensor exposure duration. Additionally, the strobing component may cause the LEDs to emit/strobe light at a particular frequency.

In some examples, the image data 536 may include 2D representations of the items 106, and/or 3D representations of the items 106. For instance, the imaging sensor(s) 228/236 may include 3D imaging devices or cameras that generate 3D models or representations of the items 106 that are placed in, or removed from, the tote 104. Thus, the image data may include 2D representations and/or 3D representations of the items 106 that may be utilized to identify the items 106 as described herein.

The tote-management system 124 may also include an item-identification component 534 configured to analyze image data 532 to identify an item 106 represented in the image data 532. The image data 532 may comprise information descriptive of a plurality of picture elements, or pixels, for one or more image frames (e.g., a still picture, multiple picture frames, video frames, etc.). The item-identification component 534 may analyze the image data 532 using various image processing techniques, or computer vision techniques. For instance, the item-identification component 534 may extract a representation of an item 106 depicted in the image data 532 generated by at least one camera(s) 228/236. The representation may include identifying text printed on the item 106, colors or color schemes printed in the item, determining 2-D and/or 3D shapes of the items 106, and/or other techniques for extract a representation of the item 106. In some instances, the representation of the item 106 depicted in the image data 532 may comprise a numeric representation, such as a feature vector or a set of feature vectors. Similarly, the item-identification component 534 may extract text data from the image data 532 that represents text on the items 106 using any text recognition or extraction technique (e.g., optical character recognition).

In some examples, a data store 522 stored in the memory 516 may include item data 558, which may include representations of the items 106 offered for acquisition at the facility 102. The item-identification component 534 may compare the extracted represented of the item 106 with the "gallery" or stored representations of the known items 106 in the item data 536. In some instance, the item representation 402 may include an indication of a barcode or SKU data for the item 106 as recognized in, or extracted from, the image data 532. The item-identification component 534 may determine confidence level data 540 based on the comparisons with item representation in the item data 536. The item-identification component 534 may determine, and assign, confidence levels indicating how likely it is that the item 106 represented in the image data 532 corresponds to an item from the item gallery 400. Based on the confidence level data 540, the item-identification component 534 may determine an item identifier 136 for the item in the image data 532 (or multiple item identifiers 136) that corresponds to an item in the item data 536 to which the item 106 corresponds.

In some examples, the item-identification component 534 may include or utilize the algorithm cascade 136 of two or more algorithms. The algorithm cascade 126 may include at least two algorithms that utilize different types of item and/or event data stored in the gallery 400 of item representations 402 to identify an item identifier 136 for the item 106 depicted in the image data 536.

In some examples, the data store 522 may include physical-layout data 558 that is used by the item-identification component 534 to determine the item 106. The physical-layout data 558 may include or provide a mapping of physical locations within the physical layout of devices and objects such that the location of the tote 104 may be utilized to determine an item 106 stored nearby. The physical-layout data 558 may indicate the coordinates within the facility 102 of an inventory location 112, items 106 stored at that inventory location 112, and so forth. In examples where the tote 104 has location determining sensors (e.g., GPS, RFID, proximity, etc.), the location sensor data may be used to determine where in the store the user 108 is. In such examples, the item-identification component 534 may access the physical-layout data 558 to determine if a location associated with the event is associated with items 106, and confidence levels for the corresponding representations of items in the item data 558. Continuing the example above, given the location within the facility 102 of the event and image camera data, the physical-layout data 558 may determine the items 106 that may have been represented in generated images of the event 110.

The tote-management system 124 may further include an event-determination component 540 to determine event-description data 560 for the item 106 in the image data 532. The event-determination component 538 may determine if the user 108 is adding an item 106 to the tote 104, removing the item from the tote 104, etc., based on movement of the item 106 and/or whether the item is shown in the image data 532. For instance, if the item 106 is shown as being moved downward towards the interior of the tote 104, and the user's hand 108 then leaves the tote 104 without the item, 106 it can be determined that the user 108 added the item 106 to the tote 104. Similarly, if the user's hand 108 moves into the tote without an item 106, and is depicted in the image data 532 taking an item 106 from the tote, the event-determination component 538 may determine that the user 108 removed an item 106 from the tote 104. In some examples, the event-determination component 538 may analyze a trajectory of the hand of the user 106 to determine, using two or more images representing the hand over time, whether the trajectory of the item 106 is moving into the tote 104, or out of the tote 104.

The tote-management system 124 may also include a virtual-tote management component 142 configured to manage virtual item listing data 550 for the tote 104. For instance, the virtual-tote management component 542 may utilize the item data 536, event-description data 538, and confidence level data 542 to add item identifier(s) 552 to the virtual item listing data 550 for items 106 that were added to the tote 104, remove item identifier(s) 552 from the virtual item listing data 550 for items 106 that were removed from the tote 104, and track item quantity data 554 indicating quantities of particular items 106 in the tote 104.

The tote-management system 124 may further include a user-interface component 556 configured to present user interfaces on the display 506 based on user-interface data 562. The user interfaces 562 may include one or more fields to present data, and/or receive touch input (or other input via a keyboard, mouse, etc.) from a user 108. For instance, if the item-identification component 534 is unable to determine an item identifier 552 for an item 106 shown in the image data 532, the user-interface component 556 may receive inquiry data 544 generated by an inquiry component 560 to prompt a user 108 for feedback to help identify the item 106, and/or other information (e.g., if multiple items were placed in the tote 104). The inquiry component 560 may be configured to generate inquiry data 544 based on the information needed to identify the item 106. For instance, the inquiry data 544 may include a prompt to request particular feedback from the user 108, such as to provide input (e.g., touch input, vocal/utterance input, etc.) to identify the item 106, input to indicate how many items 106 were added to the tote, input to indicate whether an item 106 was removed or added, etc. In some examples, the user-interface component 556 may present one or more images depicting items from the item data 558 that have the highest confidence levels as corresponding tot eh item 106 in the image data 536, but confidence levels that are not high enough to make a final decision as to the item 106. For instance, the user-interface component 556 may present pictures of two different items that have high confidence levels 542 and request that the user 108 select or indicate the appropriate item 106. Additionally, or alternatively, the user-interface component 556 may present user-interface data 562 that prompts the user for feedback regarding whether or not the item 106 was added to, or removed from the tote 104.

In some examples, the tote-management system 124 may further include a locating component 564 configured to determine locations of the tote 104 in the facility 102. For instance, the locating component 564 may analyze sensor data 530 collected by sensors of the tote 104 to determine a location. In some examples, the communication interface(s) 230 may include network interfaces that configured the tote 104 to receive or detect wireless signals (e.g., WiFi signals, Bluetooth signals, etc.) and generate sensor data 530 indicative of the signals. The locating component 564 may analyze the sensor data 530 using various techniques to identify the location of the tote 104, such as WiFi triangulation, received signal strength indicators (RSSI), and/or other methods for analyzing wireless signals to determine a location of the tote 104. In some instances, the facility 102 may include various infrared (IR) or near-IR emitters at different locations that emit light according to frequencies, patterns, etc. that indicate the different locations in the facility 102. In such examples, the tote 104 may utilize a light sensor 234 to generate the sensor data 530 representing the IR or NIR and determine the location of the tote 104 in the facility. In some instances, there may be visible landmarks or markers throughout the facility that indicate a location in the facility, and the locating component 564 may analyze image data 532 generated by an outward facing camera 236 to determine a location of the tote 104. As another example, there may be various radio frequency (RF) emitters positioned throughout the store, and the tote 104 may utilize the RF receiver 238 to allow the locating component 564 to perform RF beaconing to determine the location of the tote 104. The locating component 564 may perform one, or any combination, of the above techniques to determine a location of the tote 104 in the facility 102 and/or any other technique known in the art.

The locating component 564 may perform various operations based on determining the location of the tote 104 within the facility 102. For instance, the locating component 564 may cause user interface data 560 to be presented on the display 506 that includes a map of the facility 102 and/or directions to an item 106 for the user of the tote 104. Additionally, or alternatively, the locating component 564 may utilize the location of the tote, the physical-layout data 556, and/or item data 536 and "push" user interfaces to the display 506 that indicate various location-based information, such as indications of deals for items 106 located nearby, indications of items 106 located nearby and on the user's shopping list, and/or other user interface data 560.

Figure 6:
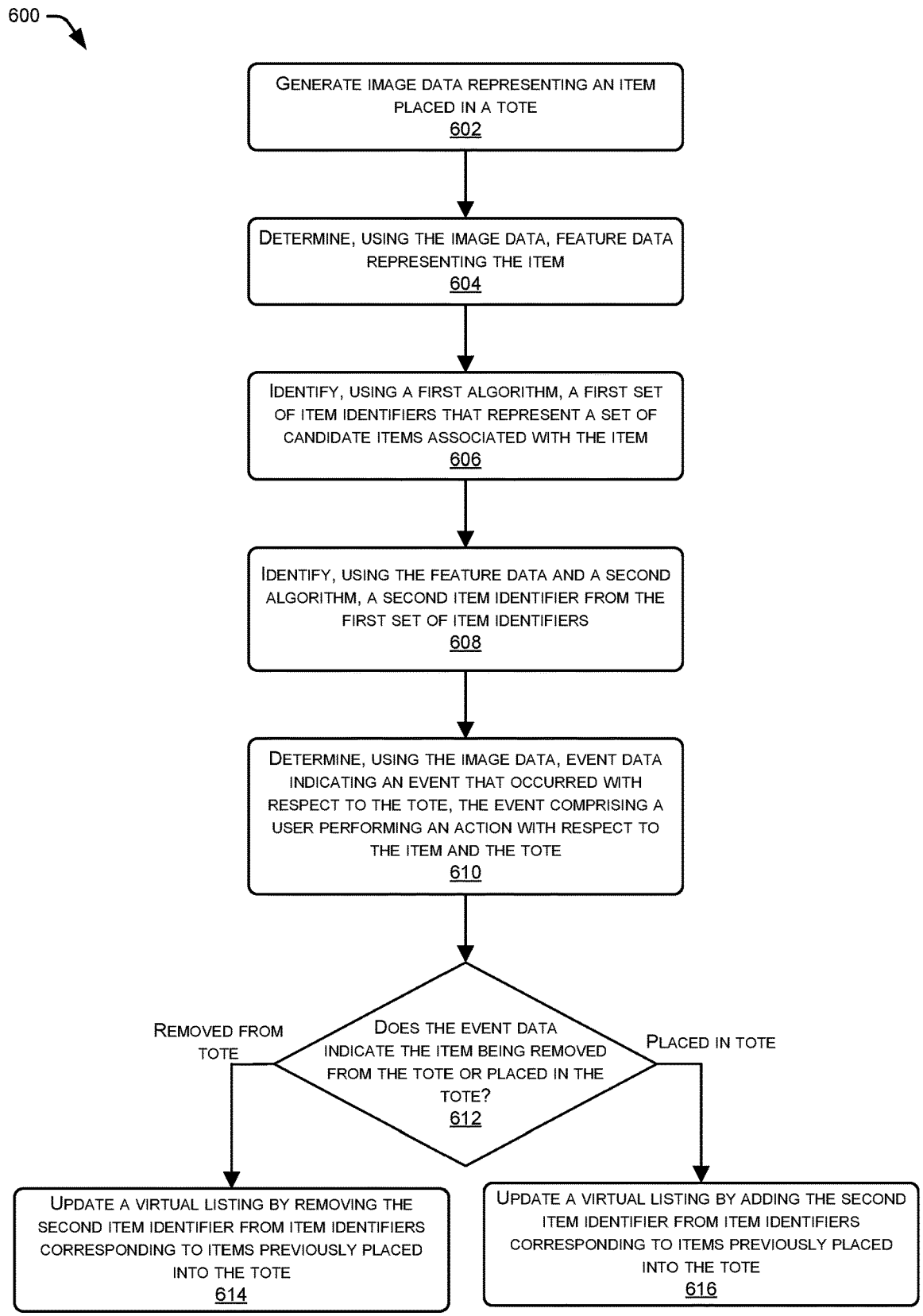
FIG. 6 illustrates a flow diagram of an example process for an item-identifying tote using cascading algorithms to automatically identify items placed in the tote.

FIG. 6 illustrates a flow diagram of an example process 600 for an item-identifying tote using cascading algorithms to automatically identify items placed in the tote.

At 602, the tote 104 may generate image data representing an item placed in the tote. The image data may comprise any type of representation of the item 106, such as 2D representations, 3D representations, thermal representations, and so forth. At 604, the tote may determine, using the image data, feature data representing the item. Generally, the feature data may comprise any type of data, such as data included in the algorithm data 138. The feature data may include text data extracted from image data representing the item 106, item feature data representing characteristics of the item 106 (e.g., color(s), texture, shape, dimensions, etc.), barcode data representing at least a portion of a barcode on the item 106, and/or any other feature data.

At 606, the tote 104 may identify, using a first algorithm, first set of item identifiers that represent a set of candidate items associated with the item. The tote 104 may utilize any of the algorithm data 138 for the first algorithm, such as location data, weight data, shopping list data, shopping history data, text data, item feature data, barcode data, environment feature data, and/or any other data. For instance, the item-identification component 534 may compare location data of the tote 104 with location data for each of the item representations 402 and determine (e.g., using a planogram), a first set of item identifiers for items 106 that are within a threshold distance to the tote 104. As another example, the item-identification component 534 may compare text data extracted from the image data representing the item 106 and compare it to respective text data 406 for each of the first set of item representations 402 and determine set of candidate items that have respective text data that corresponds to the text data of the item 106 by more than some threshold amount (e.g., 30% correlation, 50%, correlation, 70% correlation, etc.). In some instances, the item-identification component 534 may compare feature data 408 (e.g., color, dimensions, texture, shape, etc.) that represents characteristics of the item 106 which feature data 408 in the first set item representations 402 to identify the set of candidate items. The set of candidate items may be associated with respective feature data 408 that corresponds to the feature data of the item 106 by more than a threshold amount.

Even further, the item-identification component 534 may, at 606, compare weight data 410 of the item 106 (e.g., weight sensor in the tote 104) with weight data 410 for each of the first set of item representations to identify the set of candidate items that have associated weight data 410 within a threshold amount to the weight data of the item 106 (e.g., within 10%, within 5%, etc.). In some examples, the item-identification component 534 may compare barcode data extracted from the image data representing the item 106 with barcode data 414 for each of the item representation 402 in the gallery 400 to identify the set of items. For instance, each of the set of items may be associated with barcode data 414 that is within a threshold similarity to barcode data extracted from the image data representing the item 106. As an example, a user's hand may be at least partially covering or occluding a barcode on the item placed in the tote 104, but some of the barcode may be showing such that barcode data representing the item 106 may be useful to compare with barcode data 414. The item-identification component 534 may identify the set of items having barcode data 414 that corresponds, at least partly, to barcode data of the item 106.

At 608, the tote 104 may identify, using the feature data and a second algorithm, a second item identifier from the first set of item identifiers. For instance, the item-identification component 534 may compare feature data (e.g., text data, item feature data, etc.) with respective text data 406 and/or feature data 408 for the set of items to identify a second item identifier of the first set of item identifiers.

At 610, the tote 104 may determine, using the image data, event data indicating an event that occurred with respect to the tote 104. In some examples, the event comprises a user performing an action with respect to the item and the tote 104 (e.g., adding the item 106, removing the item 106, movement by the tote 104, movement of the tote 104, etc.).

At 612, the tote 104 may determine whether the event data indicates the item 104 being removed from the tote 104 or placed in the tote 104. If the tote determines that the item 104 was removed from the tote 104, the tote 104 may update a virtual listing by removing the second item identifier from item identifiers corresponding to items previously placed into the tote 104. Alternatively, if the tote determines that the item was being placed in the tote 104, the tote may update a virtual listing by adding the second item identifier from item identifiers corresponding to items previously placed into the tote 104. Generally, the tote 104 may be any type of mobile apparatus configured to receive items in a receptacle of the mobile apparatus (or other item storage area).

Figure 7:
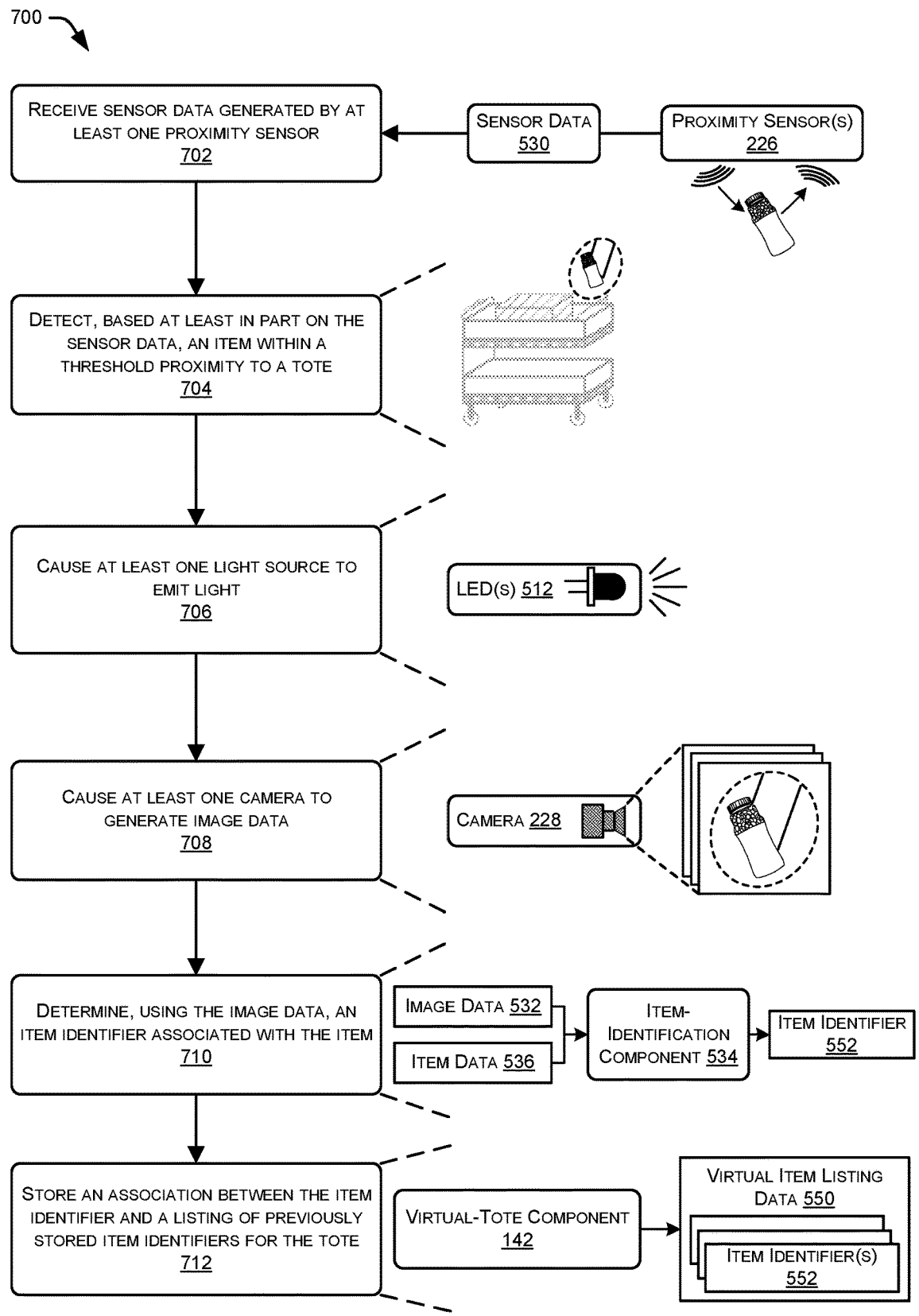
FIG. 7 illustrates a flow diagram of an example process for an item-identifying tote to identify an item placed in the tote.

FIG. 7 illustrates a flow diagram 700 of an example process for an item-identifying tote 104 to identify an item 106 placed in the tote 104.

The process 700 discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At 702, the processor(s) 502 of the tote 104 may receive sensor data 530 generated by at least one proximity sensor 226, such as a ToF sensor, a PIR sensor, and/or another proximity sensor 226. At 704, the processor(s) 502 of the tote 104 may detect, based at least in part on the sensor data 226, an item 106 within a threshold proximity to the tote 104, such as moving through a perimeter of a top of a frame of the tote 104.

At 706, the processor(s) 502 of the tote 104 may cause at least one light source to emit light. For instance, the processor(s) 502 of the tote 104 may cause a strobing component to activate and deactivate (or pulse) an LED 512 at a particular frequency. In some instances, the LED 512 may be all LEDs 512 on the tote 512, multiple LEDs 512, and/or a single LED 512.

At 708, the processor(s) 502 of the tote 104 may cause at least one camera 228 to generate image data 532. For instance, the processor(s) 502 of the tote 104 may cause a strobing component to open and close the camera shutter at a particular frequency for predefined exposure periods.

At 710, the processor(s) 502 of the tote 104 may determine, using the image data 532, an item identifier 552 associated with the item 106. For instance, the item-identification component 534 may extract feature data from the image data 532, and compare the feature data to representations of items in item data 536 for items 106 offered for acquisition in the facility 102. In some instances, the item data 536 that corresponds to the feature data for the item 106 in the image data 532 with the highest confidence level data 542 may have its respective item identifier 552 selected.

At 712, the processor(s) 502 of the tote 104 may store an association between the item identifier 552 and a listing of previously stored item identifiers 552 for the tote 104. For instance, the virtual-tote management component 142 may determine that the user 108 added an item 106 to the tote 104, and add an item identifier 552 for the item 106 (or items), and also an item quantity data 554 if multiple items were added.

In some examples, the tote 104 may not have a light of a ToF sensor at all. For instance, the tote 104 may simply include the camera 228 and utilize ambient light in the environment. In some instances, the LEDs 512 may be on the tote 104 and be permanently activated rather than being turned on and off.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method comprising:
determining a location of a mobile apparatus within a facility;
identifying, from planogram data associated with the facility, a set of items based at least in part on the location of the mobile apparatus, each item of the set of items associated with a respective location that is within a threshold distance of the location of the mobile apparatus;
receiving image data associated with an item at least one of placed in or removed from the mobile apparatus;
identifying the item from the set of items based at least in part on the image data; and
updating a virtual listing based at least in part on an item identifier that corresponds to the item.

2. The method as recited in claim 1, further comprising receiving sensor data generated by a sensor associated with the mobile apparatus, and wherein the determining the location comprises determining the location of the mobile apparatus based at least in part on the sensor data.

3. The method as recited in claim 1, wherein:
the image data comprises first image data;
the method further comprises receiving second image data generated by a camera in the facility and separate from the mobile apparatus, the second image data representing the mobile apparatus; and the determining the location comprises determining the location of the mobile apparatus based at least in part on the second image data.

4. The method as recited in claim 1, further comprising generating the image data using a camera in the facility and separate from the mobile apparatus, and wherein the identifying the item comprises identifying the item from the set of items based at least in part on analyzing the image data generated using the camera in the facility and separate from the mobile apparatus.

5. The method as recited in claim 1, further comprising generating the image data using a camera coupled to the mobile apparatus, and wherein the identifying the item comprises identifying the item from the set of items based at least in part on analyzing the image data generated using the camera coupled to the mobile apparatus.

6. The method as recited in claim 1, further comprising determining, using the image data, feature data representing the item, the feature data based at least in part in part on at least one of a color of the item, a dimension of the item, a shape of the item, text on the item, or an amount of text on the item, and wherein the identifying the item comprises identifying the item based at least in part on the feature data.

7. The method as recited in claim 1, further comprising receiving weight data associated with the item being at least one of placed in or removed from the mobile apparatus, and wherein the identifying the item further comprises identifying the item based at least in part on the weight data.

8. A system comprising:
one or more processors; and
one or more non-transitory computer-readable media storing computer-executable instructions that, when executed, cause the one or more processors to perform acts comprising:
determining a location of a mobile apparatus within a facility;
identifying, from planogram data associated with the facility, a set of items based at least in part on the location of the mobile apparatus, each item of the set of items associated with a respective location that is within a threshold distance of the location of the mobile apparatus;
receiving image data associated with an item at least one of placed in or removed from the mobile apparatus;
identifying the item from the set of items based at least in part on the image data; and
updating a virtual listing based at least in part on an item identifier that corresponds to the item.

9. The system as recited in claim 8, wherein:
the image data comprises first image data;
the acts further comprise receiving second image data generated by a camera in the facility and separate from the mobile apparatus, the second image data representing the mobile apparatus; and
the determining the location comprises determining the location of the mobile apparatus based at least in part on the second image data.

10. The system as recited in claim 8, the acts further comprising receiving sensor data generated by a sensor associated with the mobile apparatus, and wherein the determining the location comprises determining the location of the mobile apparatus based at least in part on the sensor data.

11. The system as recited in claim 8, the acts further comprising generating the image data using a camera in the facility and separate from the mobile apparatus, and wherein the identifying the item comprises identifying the item from the set of items based at least in part on analyzing the image data generated using the camera in the facility and separate from the mobile apparatus.

12. The system as recited in claim 8, the acts further comprising generating the image data using a camera coupled to the mobile apparatus, and wherein the identifying the item comprises identifying the item from the set of items based at least in part on analyzing the image data generated using the camera coupled to the mobile apparatus.

13. The system as recited in claim 8, the acts further comprising determining, using the image data, feature data representing the item, the feature data based at least in part in part on at least one of a color of the item, a dimension of the item, a shape of the item, text on the item, or an amount of text on the item, and wherein the identifying the item comprises identifying the item based at least in part on the feature data.

14. The system as recited in claim 8, the acts further comprising receiving weight data associated with the item being at least one of placed in or removed from the mobile apparatus, and wherein the identifying the item further comprises identifying the item based at least in part on the weight data.

15. One or more non-transitory computer-readable media storing computer-executable instructions that, when executed, cause one or more processors to perform acts comprising:
determining a location of a mobile apparatus within a facility;
identifying, from planogram data associated with the facility, a set of items based at least in part on the location of the mobile apparatus, each item of the set of items associated with a respective location that is within a threshold distance of the location of the mobile apparatus;
receiving image data associated with an item at least one of placed in or removed from the mobile apparatus;
identifying the item from the set of items based at least in part on the image data; and
updating a virtual listing based at least in part on an item identifier that corresponds to the item.

16. The one or more non-transitory computer-readable media as recited in claim 15, wherein:
the image data comprises first image data;
the acts further comprise receiving second image data generated by a camera in the facility and separate from the mobile apparatus, the second image data representing the mobile apparatus; and
the determining the location comprises determining the location of the mobile apparatus based at least in part on the second image data.

17. The one or more non-transitory computer-readable media as recited in claim 15, the acts further comprising receiving sensor data generated by a sensor associated with the mobile apparatus, and wherein the determining the location comprises determining the location of the mobile apparatus based at least in part on the sensor data.

18. The one or more non-transitory computer-readable media as recited in claim 15, the acts further comprising generating the image data using a camera in the facility and separate from the mobile apparatus, and wherein the identifying the item comprises identifying the item from the set of items based at least in part on analyzing the image data generated using the camera in the facility and separate from the mobile apparatus.

19. The one or more non-transitory computer-readable media as recited in claim 15, the acts further comprising generating the image data using a camera coupled to the mobile apparatus, and wherein the identifying the item comprises identifying the item from the set of items based at least in part on analyzing the image data generated using the camera coupled to the mobile apparatus.

20. The one or more non-transitory computer-readable media as recited in claim 15, the acts further comprising determining, using the image data, feature data representing the item, the feature data based at least in part in part on at least one of a color of the item, a dimension of the item, a shape of the item, text on the item, or an amount of text on the item, and wherein the identifying the item comprises identifying the item based at least in part on the feature data.

* * * * *